(12) United States Patent
Hatori et al.

(10) Patent No.: US 7,705,992 B2
(45) Date of Patent: *Apr. 27, 2010

(54) OPTICAL COHERENCE TOMOGRAPHY SYSTEM

(75) Inventors: Masami Hatori, Kangawa-ken (JP); Kiichi Kato, Kangawa-ken (JP)

(73) Assignees: FUJIFILM Corporation, Tokyo (JP); Fujinon Corporation, Saitama-shi, Saitama-ken (JP)

( * ) Notice: Subject to any disclaimer, the term of this patent is extended or adjusted under 35 U.S.C. 154(b) by 209 days.

This patent is subject to a terminal disclaimer.

(21) Appl. No.: 11/839,139

(22) Filed: Aug. 15, 2007

(65) Prior Publication Data

US 2008/0043244 A1 Feb. 21, 2008

(30) Foreign Application Priority Data

Aug. 15, 2006 (JP) .............................. 2006-221412
Jun. 7, 2007 (JP) .............................. 2007-152007

(51) Int. Cl.
*G01B 9/02* (2006.01)
*G01B 11/02* (2006.01)

(52) U.S. Cl. ...................................... 356/479; 356/497
(58) Field of Classification Search ................. 356/477, 356/479, 497
See application file for complete search history.

(56) References Cited

U.S. PATENT DOCUMENTS

| | | | | |
|---|---|---|---|---|
| 5,321,501 A | * | 6/1994 | Swanson et al. | ............. 356/479 |
| 5,459,570 A | * | 10/1995 | Swanson et al. | ............. 356/479 |
| 6,160,826 A | * | 12/2000 | Swanson et al. | ............... 372/20 |
| 6,564,089 B2 | | 5/2003 | Izatt et al. | |
| 6,615,072 B1 | | 9/2003 | Izatt et al. | |
| 6,687,010 B1 | | 2/2004 | Horii et al. | |
| 7,133,138 B2 | | 11/2006 | Horii et al. | |
| 2005/0213103 A1 | * | 9/2005 | Everett et al. | ............... 356/479 |
| 2008/0252900 A1 | * | 10/2008 | Hatori | ........................ 356/482 |

FOREIGN PATENT DOCUMENTS

JP 2002-301049 A 10/2002

OTHER PUBLICATIONS

R. Huber et al., Amplified, frequency swept lasers for frequency domain reflectometry and OCT imaging: design and scaling principles., Optics Express, May 2, 2005, pp. 3513-3528, vol. 13, No. 9.
M. Pircher et al., "Three dimensional polarization sensitive OCT of human skin in vivo.", Optics Express, 2004, pp. 3236-3244, vol. 12, Issue 14.

(Continued)

*Primary Examiner*—Patrick J Connolly
(74) *Attorney, Agent, or Firm*—Sughrue Mion PLLC

(57) ABSTRACT

A polarization maintaining optical fiber, for guiding a measuring light beam, is provided within a probe. The probe is configured to be rotatable in the circumferential direction of the polarization maintaining optical fiber. A polarization direction rotator, for rotating the polarization direction of the measuring light beam that enters the polarization maintaining optical fiber accompanying rotation of the probe, is provided in order to maintain a state in which the polarization direction of the measuring light beam that enters the polarization maintaining optical fiber and the direction of the polarization axis of the polarization maintaining optical fiber are matched.

12 Claims, 17 Drawing Sheets

OTHER PUBLICATIONS

Johannes F. De Boer et al., "Determination of the depth-resolved Stokes parameters of light backscattered from turbid media by use of polarization-sensitive optical coherence tomography.", Optics Letters, Mar. 1, 1999, pp. 300-302, vol. 24, No. 5.

Mitsuo Takeda, "Optical Frequency Scanning Interference Microscopes.", Optics Engineering Contact, 2003, pp. 426-432, vol. 41, No. 7.

* cited by examiner

OPTICAL COHERENCE TOMOGRAPHY SYSTEM

BACKGROUND OF THE INVENTION

1. Field of the Invention

The present invention relates to an optical tomography system that obtains optical tomographic images by OCT (Optical Coherence Tomography) measurement.

2. Description of the Related Art

Conventionally, optical tomographs that utilize OCT measurement are employed to obtain tomographic images of living tissue. In an optical tomograph, a low coherence light beam emitted from a light source is divided into a measuring light beam and a reference light beam. Thereafter, a reflected light beam, which is the measuring light beam reflected by a measurement target when the measuring light beam is irradiated onto the measurement target, is combined with the reference light beam. Tomographic images are obtained, based on the intensity of a interference light beam obtained by combining the reflected light beam and the reference light beam (refer to U.S. Pat. Nos. 6,564,089, 6,615,072, 6,687,010 and 7,133,138, for example).

There are some optical tomographs that utilize TD-OCT (Time Domain OCT) measurement. In TD-OCT measurement, the measuring position in the depth direction (hereinafter, referred to as "depth position") within a measurement target is changed, by changing the optical path length of the reference light beam. Thereby, tomographic images can be obtained at different depth positions within measurement targets.

As another type of optical tomograph that can obtain tomographic images at high speeds without changing the optical path length of the reference light beam, optical tomography apparatuses that employ SD-OCT (Spectral Domain OCT) measurement have been proposed. The SD-OCT optical tomograph divides a wide band low coherence light beam into a measuring light beam and a reference light beam by a Michelson interferometer. Then, the measuring light beam is irradiated onto a measurement target, and a reflected light beam, which is the measuring light beam reflected by the measurement target, is combined with the reference light beam, to obtain a interference light beam. Thereafter, the interference light beam is decomposed into different frequency components. The channeled spectra of the decomposed interference light beam undergo Fourier analysis, and tomographic images are obtained without scanning in the depth direction (refer to "Amplified, frequency swept lasers for frequency domain reflectometry and OCT imaging: design and scaling principles", R. Huber et al., OPTICS EXPRESS, Vol. 13, No. 9, pp. 3513-3528, 2005, for example).

Further, an optical tomograph that obtains optical tomographic images at high speeds without changing the optical path length of a reference light beam, by SS-OCT (Swept Source OCT) measurement, has also been proposed. The SS-OCT optical tomograph sweeps the frequency of a laser beam which is emitted from a light source. Reflected light beams of each wavelength are caused to interfere with the reference light beam. The intensities of reflected light beams at a depth positions within a measurement target are obtained by performing Fourier analysis on interference spectra for the series of wavelengths. The tomographic images are obtained employing the detected intensities.

When the various optical tomographs described above are applied to endoscopes, optical fibers are provided within probes which are to be inserted into body cavities, and light beams are guided through the optical fibers. In optical tomographs, it is often the case that a tomographic image is obtained along a predetermined surface of a measurement target. In order to do so, it is necessary to scan the light beam around the peripheral direction of the probe. There is a known structure in which a probe is configured to be rotatable in the axial direction thereof.

Meanwhile, there are cases in which living tissue and the like exhibit birefringence or optical rotatory power. There are known optical tomographs that measure the polarization state of reflected light beams when light is irradiated onto living tissue or the like, in order to investigate these types of polarization properties (refer to Japanese Unexamined Patent Publication No. 2002-301049, "Three dimensional polarization sensitive OCT of human skin in vivo", M. Pircher et al., OPTICS EXPRESS, Vol. 12, Issue 14, pp. 3236-3244, 2004, and "Determination of the depth-resolved Stokes parameters of light backscattered from turbid media by use of polarization-sensitive optical coherence tomography", J. F. de Boer et al., OPTICS LETTERS, Vol. 24, No. 5, pp. 300-302, 1999, for example).

When the various types of optical tomographs described above are applied to endoscopes, lasers are generally used as light sources, and linearly polarized light beams having predetermined polarization directions are employed as the measuring light beam and the reference light beam. It is preferable for the reflected light beam and the reference light beam to be adjusted when they are combined, because the intensity of the interference light beam becomes maximal when the polarization directions of the reflected light beam and the reference light beam are matched. However, single mode optical fibers, which are generally used in endoscopes, cannot necessarily maintain the polarization state of light that propagates therethrough. Therefore, when variation factors such as vibration during rotation of the probe and temperature changes are applied, the polarized state of the light that propagates through the optical fiber changes. For example, even if the light beam emitted from a light source is linearly polarized light, the polarization direction may change, or a portion of the light beam may become elliptically polarized light. That is, the polarized state of light that propagates through the optical fibers is unstable.

In addition, optical components which are employed in optical tomographs, such as mirrors and fiber couplers, have polarization properties such that the transmittance, reflectance, or the dividing ratio thereof changes according to the polarization direction of light incident thereon. In the case that light having an unstable polarization state enters optical components having polarization properties, the signal level received by a detector varies, the S/N ratio decreases, and values that do not accurately reflect the results of measurement are obtained. As a result, the image quality of tomographic images deteriorates, such as by the images becoming grainy, and targets of diagnosis which should be discriminated may be overlooked. This is a problem that arises not only when measuring the polarization properties of a measurement target, but also during general measurements.

Use of a polarization maintaining optical fiber, which is capable of propagating linearly polarized light while maintaining the polarization direction thereof, within the probe may be considered. In this case, it becomes necessary to cause the linearly polarized light beam to enter the polarization maintaining optical fiber such that the polarization direction thereof matches the unique polarization axis thereof. However, if the probe is rotated to perform scanning in the peripheral direction as described above, the polarization maintaining optical fiber therein also rotates. Therefore, it is not possible for the polarization direction of the linearly polarized light and the polarization axis of the polarization maintaining optical fiber to be constantly matched. If the polarization direction and the polarization axis do not match, the linearly polarized light that enters the polarization maintaining optical fiber often becomes elliptically polarized light, which is unsuited for measurement of polarization properties. In addition, signal levels will vary, because the polarization state of emitted light changes along with the rotation of the probe, and the image quality of tomographic images will deteriorate.

A linearly polarized light beam may be converted into a nonlinearly polarized light beam prior to entering the polarization maintaining optical fiber. A polarizing plate that transmits only light having a predetermined polarization direction may be provided. The polarizing plate may be caused to rotate along with the rotation of the probe, thereby matching the polarization axis of the polarization maintaining optical fiber within the probe and the polarization direction of the light beam. However, if this configuration is adopted, light having polarization directions other than the predetermined polarization direction is absorbed or reflected, and therefore, the amount of light loss becomes great.

The optical tomograph disclosed in U.S. Pat. Nos. 6,564,089 and 6,615,072 is provided with a Faraday rotator as an element for adjusting polarization directions. However, the Faraday rotator must be miniaturized in order to be provided at the tip of the probe, which is to be inserted into body cavities. The types of Faraday rotators which are capable of being miniaturized are limited in the wavelengths for which they can be utilized, and therefore are not suited for optical tomographs. A magnetic garnet monocrystal, in which the crystal itself has magnetism, may be employed as the material of the Faraday rotator to achieve some degree of miniaturization. However, this type of Faraday rotator is likely to generate ghosts due to reflection, because the refractive index of the magnetic body is high. For this reason, reflection preventing measures, such as provision of a watertight seal filled with index matching fluid, forming bonding surfaces at angles other than right angles to prevent feedback of reflected light, and the like, become necessary. The reflection preventing measures lead to increases in manufacturing costs.

The optical tomograph disclosed in U.S. Pat. Nos. 6,564,089 and 6,615,072 also employs a polarization controller as an element for adjusting polarization directions. The optical tomograph disclosed in U.S. Pat. Nos. 6,687,010 and 7,133,138 uses a polarization maintaining optical fiber capable of maintaining the polarization state of light for a portion of the optical path, uses single mode optical fibers for the rest of the optical path, and employs a polarization controller to adjust the polarization directions of light. However, polarization controllers are mechanically driven, which results in slow operating speeds. Other shortcomings of tomographs that employ polarization controllers are that: the tomographs become bigger in size; they are unstable because of their high sensitivity; it takes time to find optimal combinations of operational parameters, as there are three parameters to be adjusted; adjustments by operators are required, because the propagating state of light within optical fibers change; and the like. That is, these tomographs are not well suited for practical use. Particularly regarding adjustment by polarization controllers, there is the aforementioned problem of control speed thereof. Therefore, if the polarization direction shifts greatly during diagnosis utilizing OCT measurement, there is a possibility that diagnosis will be interrupted.

SUMMARY OF THE INVENTION

The present invention has been developed in view of the foregoing circumstances. It is an object of the present invention to provide an optical tomography system capable of stably obtaining tomographic images having favorable image quality, even if a probe thereof is rotated.

A first optical tomography system of the present invention comprises:

a light source unit for emitting a light beam;

light dividing means, for dividing the light beam emitted from the light source unit into a measuring light beam and a reference light beam;

a probe, for guiding the measuring light beam to a measurement target, and also for guiding a reflected light beam, which is the measuring light beam reflected by the measurement target when irradiated thereon;

combining means, for combining the reflected light beam and the reference light beam;

interference light detecting means, for detecting a interference light beam, which is formed by the reflected light beam and the reference light beam being combined by the combining means; and image obtaining means, for obtaining a tomographic image of the measurement target from the interference light beam detected by the interference light detecting means; wherein:

a polarization maintaining optical fiber, for guiding the measuring light beam and the reflected light beam, is provided within the probe;

the probe is configured to be rotatable in the circumferential direction of the polarization maintaining optical fiber; and the length of the polarization maintaining optical fiber is an integer multiple of half a beat length, which is determined by the polarization maintaining optical fiber and the wavelength of the measuring light beam.

Note that the "polarization maintaining optical fiber" is an optical fiber that has two unique polarization axes which are perpendicular to each other. The polarization maintaining optical fiber is capable of propagating linearly polarized light therethrough while maintaining the polarization direction thereof, if the linearly polarized light is caused to enter the polarization maintaining optical fiber such that the polarization direction thereof matches one of the polarization axes.

Here, the "beat length" is a length at which the phase difference of the light components having the aforementioned two polarization directions becomes $2\pi$ (one period). The beat length is represented by $\lambda/B$, wherein $\lambda$ is the wavelength of the light beam that propagates through the polarization maintaining optical fiber, and B is the birefringence of the polarization maintaining optical fiber. Specifically, the "beat length" is the shortest distance that a light beam, which is linearly polarized in a direction other than the polarization axis of the polarization maintaining fiber, propagates until the polarization direction thereof returns to the linear polarization direction when it entered the polarization maintaining optical fiber. The expression "half a beat length" refers to the shortest distance that the aforementioned light beam propagates until the polarization direction thereof becomes perpendicular to the linear polarization direction when it entered the polarization maintaining optical fiber. Note that the "length of the polarization maintaining fiber" refers to the length of the polarization maintaining fiber in the direction of the optical axis thereof, that is, the length corresponds to a propagation distance.

A second optical tomography system of the present invention comprises:

a light source unit for emitting a light beam;

light dividing means, for dividing the light beam emitted from the light source unit into a measuring light beam and a reference light beam;

a probe, for guiding the measuring light beam to a measurement target, and also for guiding a reflected light beam, which is the measuring light beam reflected by the measurement target when irradiated thereon;

combining means, for combining the reflected light beam and the reference light beam;

interference light detecting means, for detecting a interference light beam, which is formed by the reflected light beam and the reference light beam being combined by the combining means; and image obtaining means, for obtaining a tomographic image of the measurement target from the interference light beam detected by the interference light detecting means; wherein:

a polarization maintaining optical fiber, for guiding the measuring light beam and the reflected light beam, is provided within the probe;

the probe is configured to be rotatable in the circumferential direction of the polarization maintaining optical fiber; and the optical tomography system further comprises polarization direction rotating means, for rotating the polarization direction of the measuring light beam that enters the polarization maintaining optical fiber accompanying rotation of the probe, in order to maintain a state in which the polarization direction of the measuring light beam that enters the polarization maintaining optical fiber and the direction of the polarization axis of the polarization maintaining optical fiber are matched.

Note that here, "the polarization direction of the measuring light beam . . . and the direction of the polarization axis of the polarization maintaining optical fiber are matched" means that the polarization direction of the measuring light beam matches one of the two polarization axes of the polarization maintaining optical fiber.

A ½ wavelength plate, for example, may be employed as the polarization direction rotating means.

A configuration may be adopted, wherein:

the measuring light beam, which is irradiated onto the measurement target, is linearly polarized in a first polarization direction;

the reference light beam which enters the combining means includes components which are polarized in the first polarization direction and polarized in a second polarization direction perpendicular to the first polarization direction; and the interference light detecting means detects each of the two polarized components.

A configuration may be adopted, wherein:

polarization maintaining optical fibers are employed to guide the light beam from the light source unit to the light dividing means, to guide the light beam from the light dividing means to the probe, to guide the light beam from the probe to the combining means, and to guide the light beam from the light dividing means to the combining means.

The optical tomography system may be that which utilizes SS-OCT measurement, by adopting a configuration wherein:

the light source unit emits a laser beam, of which the wavelength is swept with a predetermined period; and the image obtaining means obtains the tomographic image of the measurement target by performing frequency analysis on the interference light beam.

The light source unit may comprise:

optical amplifying means;

a polarization maintaining optical fiber that guides a portion of the light output from the optical amplifying means back to the optical amplifying means as a feedback light beam; and a tunable Fabry Perot filter, for selecting the wavelength of the feedback light beam.

The optical tomography system may be that which utilizes SD-OCT measurement, by adopting a configuration wherein:

the light source unit emits a low coherence light beam; and the image obtaining means obtains the tomographic image of the measurement target by performing frequency analysis on the interference light beam.

In the first optical tomography system of the present invention, a polarization maintaining optical fiber is employed to guide the measuring light beam and the reflected light beam within the probe, which rotates. The length of the polarizing maintaining optical fiber is set to an integer multiple of half the beat length. Therefore, linearly polarized light that enters the polarization maintaining optical fiber is emitted as linearly polarized light having its original polarization direction or a polarization direction perpendicular to the original polarization direction, regardless of the original polarization direction or the polarization axis of the polarization maintaining optical fiber. Accordingly, the light beam which is irradiated onto the measurement target is always a linearly polarized light beam with a uniform polarization direction, even if the probe is rotated. The first optical tomography system of the present invention is capable of stably obtaining tomographic images having favorable image quality, while solving the problems related to control speed when the conventional polarization controllers are used, and the problems related to cost when Faraday rotators are employed.

In the second optical tomography system, the polarization direction rotating means maintains the state in which the polarization direction of the measuring light beam that enters the polarization maintaining optical fiber and the direction of the polarization axis of the polarization maintaining optical fiber are matched. Accordingly, the light beam which is emitted from the polarization maintaining optical fiber is always a linearly polarized light beam having a polarization direction which is the same as the polarization axis of the polarization maintaining optical fiber, even if the probe is rotated. The second optical tomography system of the present invention is capable of stably obtaining tomographic images having favorable image quality, while solving the problems related to control speed when the conventional polarization controllers are used, and the problems related to cost when Faraday rotators are employed.

A configuration may be adopted, wherein: the measuring light beam, which is irradiated onto the measurement target, is linearly polarized in a first polarization direction; the reference light beam which enters the combining means includes components which are polarized in the first polarization direction and polarize in a second polarization direction perpendicular to the first polarization direction; and the interference light detecting means detects each of the two polarized components. In this case, the optical rotatory power of the measurement target can be measured.

A configuration may be adopted, wherein: polarization maintaining optical fibers are employed to guide the light beam from the light source unit to the light dividing means, to guide the light beam from the light dividing means to the probe, to guide the light beam from the probe to the combining means, and to guide the light beam from the light dividing means to the combining means. In this case, it becomes possible to propagate light while maintaining the polarization state thereof along all of the optical paths above, regardless of whether forces such as bending and twisting, or variation factors such as temperature change and vibration are applied. Accordingly, it becomes possible to prevent variations in polarization states due to measurement environments, and to stably and reproducibly obtain tomographic images having favorable image quality, without using a Faraday rotator or a polarization controller.

A configuration may be adopted, wherein: the light source unit emits a laser beam, of which the wavelength is swept with a predetermined period; and the image obtaining means obtains the tomographic image of the measurement target by performing frequency analysis on the interference light beam. In this case, the tomograph can be that which utilizes SS-OCT measurement, and tomographic images can be obtained at high speeds without changing the optical path length of the reference light beam.

Here, the light source unit may comprise: optical amplifying means; a polarization maintaining optical fiber that guides a portion of the light output from the optical amplifying means back to the optical amplifying means as a feedback light beam; and a tunable Fabry Perot filter, for selecting the wavelength of the feedback light beam. In this case, the polarization state within the light source unit can be stably maintained, and wavelength sweeping can be stably performed by the mechanically reliable tunable Fabry Perot filter.

A configuration maybe adopted, wherein: the light source unit emits a low coherence light beam; and the image obtaining means obtains the tomographic image of the measurement target by performing frequency analysis on the interference light beam. In this case, the tomograph can be that which utilizes SD-OCT measurement, and tomographic images can be obtained at high speeds without changing the optical path length of the reference light beam.

DESCRIPTION OF THE PREFERRED EMBODIMENTS

Hereinafter, optical tomography systems according to embodiments of the present invention will be described hereinafter, with reference to the attached drawings.

Figure 1:
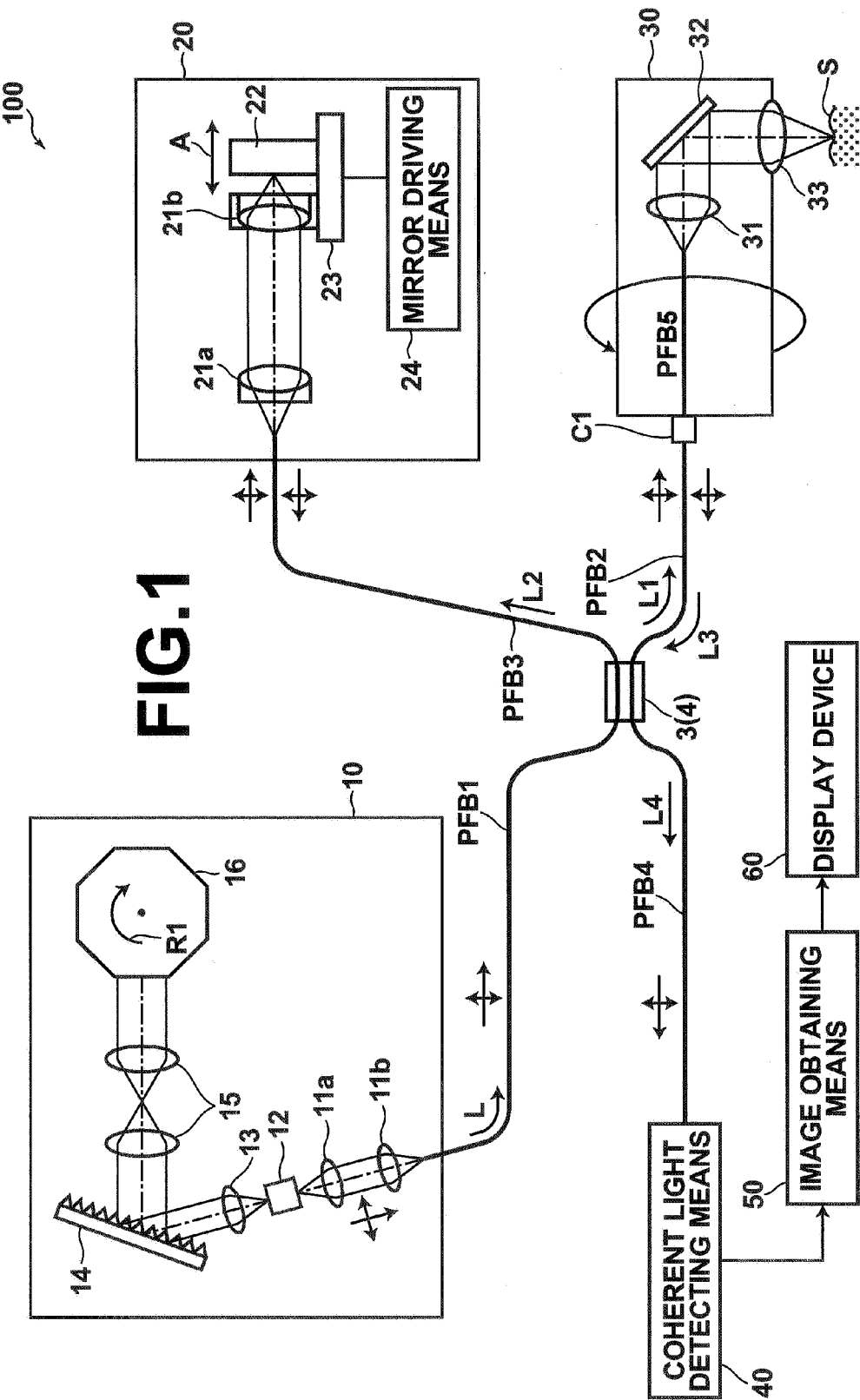
FIG. 1 is a diagram that illustrates the construction of an optical tomography system according to an exemplary embodiment of the present invention.

FIG. 1 is a diagram that illustrates the construction of an optical tomography system 100 according to the first embodiment of the present invention. The optical tomography system 100 obtains tomographic images of measurement targets, such as living tissue and cells within body cavities, by SS-OCT measurement. The optical tomography system 100 comprises: a light source unit 10, for emitting a light beam L; a light dividing means 3, for dividing the light beam L emitted from the light source unit 10 into a measuring light beam L1 and a reference light beam L2; an optical path length adjusting means 20, for adjusting the optical path length of the reference light beam L2 output by the light dividing means 3; a probe 30, for guiding the measuring light beam L1 output by the light dividing means 3 to a measurement target S, and for guiding a reflected light beam L3, which is the measuring light beam L1 reflected by the measurement target S; a combining means 4, for combining the reflected light beam L3 and the reference light beam L2; and a interference light detecting means 40, for detecting a interference light beam L4, which is the reflected light beam L3 and the reference light beam L2 which are combined by the combining means 4; and an image obtaining means 50, for obtaining a tomographic image of the measurement target S by performing frequency analysis on the interference light beam L4 detected by the interference light detecting means 40.

Note that in the following description of the optical tomography system 100 according to the first embodiment, the measurement target S will be described as that which does not have optical rotatory power, in order to simplify the description. However, it is also possible to obtain tomographic images of measurement targets S having optical rotatory power, using the optical tomography system 100. The same applies to tomographs which will be described in the embodiments to follow, unless otherwise noted.

The light source unit 10 emits a laser beam as the light beam L, while sweeping the frequency thereof with a predetermined period. A semiconductor medium, which is used for semiconductor lasers, is utilized as the laser medium. Specifically, the light source unit 10 comprises: optical linking lenses 11a and 11b; a semiconductor laser medium 12; a collimating lens 13; a diffracting optical element 14; relay lenses 15; and a polygon mirror 16.

The collimating lens 13 collimates the light beam emitted from the semiconductor laser medium 12. The wavelengths of the collimated light beam are spatially dispersed by the diffracting optical element 14. The light beam passes through the relay lenses 15, and is reflected by the polygon mirror 15. A portion of the reflected light beam passes through the same path in the reverse direction, and returns to the semiconductor laser medium as a feedback light beam.

The polygon mirror 16 rotates in the direction indicated by arrow R1, to vary the angle of each reflective surface thereof with respect to the optical axis of the relay lenses 15. Thereby, only a light beam having a specific wavelength, from among the light beam of which the wavelengths have been spatially dispersed by the diffraction grating 14, returns to the semiconductor laser medium 12 as the feedback light beam. A resonator is constituted by the light emitting facet of the semiconductor laser medium 12 toward the side of the collimating lens 13 and the polygon mirror 16. The laser light beam L is emitted from the light emitting facet of the semiconductor laser medium 12 toward the side of the optical coupling lens 11a. At this time, non reflective films are coated on the light emitting and the light incident facets of the semiconductor laser medium 12. The semiconductor laser medium 12 is configured to not perform laser oscillation by itself. The semiconductor laser medium 12 is designed such that external feedback light from the polygon mirror 16 forms a resonator, to enable laser oscillation to occur. Note that the wavelength of the laser beam L is determined by the wavelength of the feedback light beam, which is determined by the diffracting optical element 14. The laser light beam L which is emitted by the semiconductor laser medium 12 is collimated by the lens 11a, condensed by the lens 11b, and enters an optical fiber PFB1.

The wavelength of the feedback light beam is determined by the angle between the optical axis of the relay lenses 15 and the reflective surface of the polygon mirror 16. Therefore, as the polygon mirror 16 rotates in the direction of the arrow R1 at a constant speed, the wavelength of the light beam that reenters the semiconductor laser medium 12 from the polygon mirror 16 changes with a predetermined period over the passage of time. As a result, the laser beam L having a wavelength which is swept at the predetermined period is emitted from the light source unit 10 into the optical fiber PFB1. Note that the laser beam L enters the optical fiber PFB1 in a substantially linearly polarized state.

The light dividing means 3 is constituted by a 2×2 optical fiber coupler, for example. The light dividing means 3 functions to divide the light beam L emitted by the light source unit 10 and guided through the optical fiber PFB1 into the measuring light beam L1 and the reference light beam L2. The division ratio of the light dividing means 3 is 50:50, for example. The light dividing means 3 is optically connected to optical fibers PFB2 and PFB3. The measuring light beam L1 is guided through the optical fiber FB2 to the probe 30, and the reference light beam L2 is guided through the optical fiber FB3 to the optical path length adjusting means 20. Note that the light dividing means 3 of the present embodiment also functions as the combining means 4.

The optical fiber FB2 is optically connected to the optical probe 30, and the measuring light beam L1 is guided through the optical fiber FB2 to the optical probe 30. The optical probe 30 is to be inserted into body cavities via a forceps opening and a forceps channel, and is removably mounted to the optical fiber FB2 with an optical connector C1.

The probe 30 comprises: a probe outer cylinder, which has a closed distal end; an optical fiber PFB5, which is provided to extend along the axial direction of the outer cylinder within the interior space thereof, for guiding the measuring light beam L1 and the reflected light beam L3; a collimating lens 31, for collimating the measuring light beam L1 emitted from the tip of the optical fiber PFB5; a mirror 32, for reflecting the measuring light beam L1, which has been collimated by the collimating lens 31; and a condensing lens 33, for condensing the measuring light beam L1 reflected by the mirror 32 such that it converges within the measurement target S.

The probe 30 is capable of being rotated with respect to the optical connector C1 in the circumferential direction of the optical fiber PFB5 by drive means (now shown). The measuring light beam L1 emitted form the probe 30 is deflected in the circumferential direction of the outer cylinder of the probe 30, to enable scanning and measurement of the measurement target S. Note that the probe 30 and the optical connector C1 are configured such that the amount of light loss during rotation is substantially 0. The polarization state of light within the probe 30 and the other components will be described in detail later.

The optical path length adjusting means 20 is provided at the end of the optical fiber PFB3 from which the reference light beam L2 is emitted. The optical path length adjusting means 20 functions to change the optical path length of the reference light beam L2, to adjust the initial position at which tomographic images of the measurement target S are obtained. The optical path length adjusting means 20 comprises: a mirror 22, for reflecting the reference light beam L2 emitted from the optical fiber PFB3; a first optical lens 21a, provided between the optical fiber PFB3 and the mirror 22; and a second optical lens 21b, provided between the first optical lens 21a and the mirror 22.

The first optical lens 21a functions to collimate the reference light beam L2 emitted from the optical fiber PFB3, and to focus the reference light beam L2 reflected by the mirror 22 onto the core of the optical fiber PFB3. The second optical lens 21b functions to focus the reference light beam L2 collimated by the first optical lens 21a onto the mirror 22, and to collimate the reference light beam L2 reflected by the mirror 22.

Accordingly, the reference light beam L2 emitted from the optical fiber PFB3 is collimated by the first optical lens 21a, and focused on the mirror 22 by the second optical lens 21b. Thereafter, the reference light beam L2 reflected by the mirror 22 is collimated by the second optical lens 21b, and focused onto the core of the optical fiber PFB3 by the first optical lens 21a.

The optical path length adjusting means 20 further comprises: a movable stage 23, on which the second optical lens 21b and the mirror 22 are fixed; and a mirror moving means 24, for moving the movable stage 23 in the direction of the optical axis of the first optical lens 21a. The optical path length of the reference light beam L2 is varied, by moving the movable stage 23 in the direction indicated by arrow A.

The combining means 4 is constituted by the aforementioned 2×2 optical coupler. The combining means 4 combines the reference light beam L2, of which the optical path length has been adjusted by the optical path length adjusting means 20, and the reflected light beam L3 reflected by the measurement target S. The combined interference light beam L4 is emitted toward the interference light detecting means 40 via an optical fiber PFB4, for guiding the interference light beam L4.

The interference light detecting means 40 detects the interference light beam L4 formed by the combining means 4 combining the reflected light beam L3 and the reference light beam L2, and measures the intensity thereof. The interference light detecting means 40 is connected to the image obtaining means 50, which is constituted by a computer system such as a personal computer. The image obtaining means 50 is connected to a display device 60, which is constituted by a CRT, a liquid crystal display, or the like. The image obtaining means 50 obtains tomographic images of the measurement target S, by detecting the intensity of the reflected light beam L3 at various depth positions via frequency analysis of the interference light beam L4 detected by the interference light detecting means 40.

Here, detection of the interference light beam L4 by the interference light detecting means 40 and image generation by the image obtaining means 50 will be described briefly. Note that a detailed description of these two points can be found in "Optical Frequency Scanning Interference Microscopes", M. Takeda, Optical Engineering Contact, Vol. 41, No. 7, pp. 426-432, 2003.

When the measuring light beam L1 is irradiated onto the measurement target S, the reflected light beam L3, which is reflected at various depths within the measurement target S and the reference light beam L2 interfere with each other, with various optical path length differences. By designating the optical intensity of the interference pattern with respect to each of the optical path length differences l as S(l), the optical intensity I(k) detected by the interference light detecting means 40 can be expressed as:

$$I(k)=\int_0^\infty S(l)[1+\cos(kl)]dl \quad (1)$$

wherein:
k: wave number
l: optical path length difference

Formula (1) above may be considered as being provided as an interferogram of an optical frequency range, in which the wave number k=ω/c is a variable. For this reason, the image obtaining means 50 performs frequency analysis by performing Fourier transform on the spectral interference pattern detected by the interference light detecting means 40, to determine the optical intensity (I) of the interference light beam L4. Thereby, data regarding the intensity of the reflected light beam L3 at various depth positions within the measurement target S can be obtained, and generation of tomographic images is enabled. The display device 60 displays the generated tomographic images.

Hereinafter, the polarization state of the optical tomography system 100 will be described in detail. In the optical tomography system 100, the optical fibers PFB1, PFB2, PFB3, PFB4, and PFB5 are all polarization maintaining optical fibers that function as waveguide means. Polarization maintaining optical fibers have two unique polarization axes. If the linearly polarized light is caused to enter polarization maintaining optical fibers in a state that the polarization direction thereof matches either of the polarization axes, the linearly polarized light is enabled to propagate through the polarization maintaining fibers while maintaining the polarization direction thereof.

Figure 2:
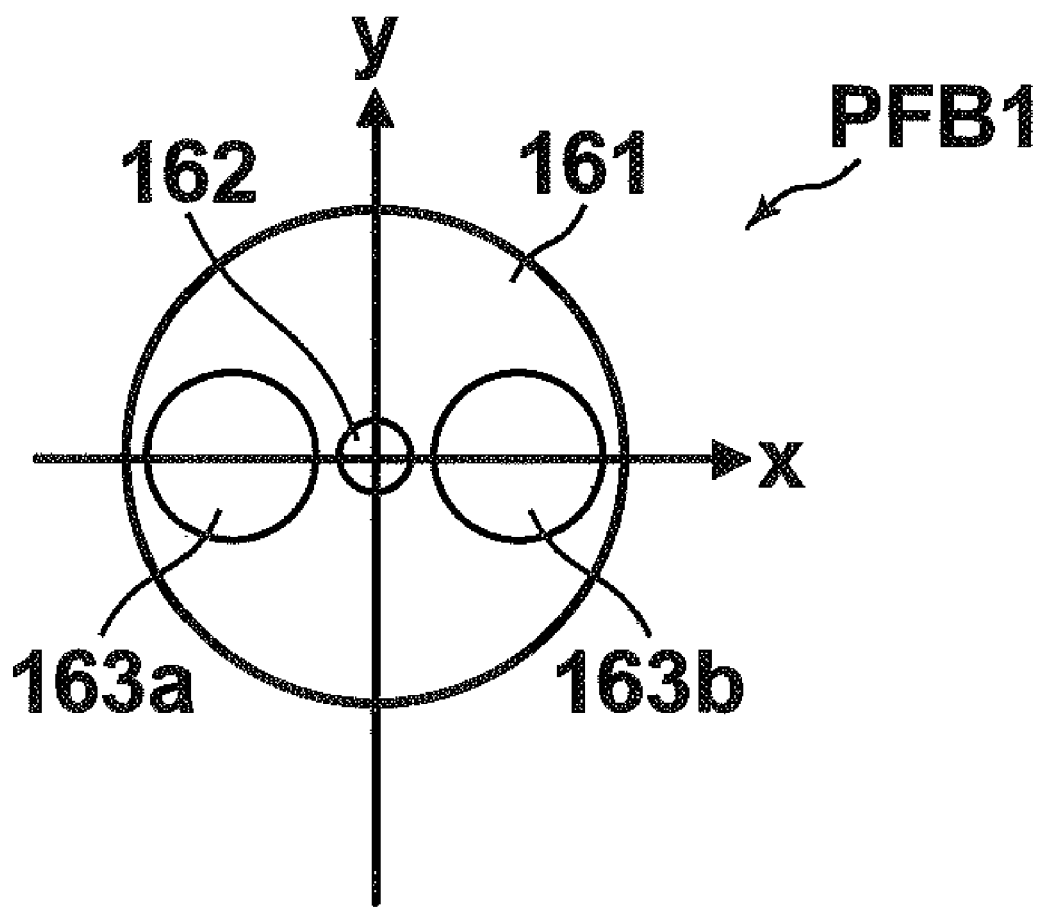
FIG. 2 is a cross sectional view of a PANDA fiber.

FIG. 2 is a cross sectional view of a PANDA (Polarization maintaining AND Absorption reducing) fiber, as an example of a polarization maintaining optical fiber. As illustrated in FIG. 2, the PANDA fiber has a structure in which two force applying portions 163a and 163b for applying axially asymmetrical forces are provided on both sides of a core 162 at the center of cladding 161. The polarization axes of the PANDA fiber are an X axis which is parallel to the direction in which the force applying portions 163a and 163b are arranged, and a Y axis perpendicular o the X axis.

Note that the aforementioned PANDA fiber will be described as the polarization maintaining optical fiber in the following description, but the present invention is not limited to utilizing PANDA fibers. Alternatively, oval core fibers, in which the shape of the core is axially asymmetrical, may be employed as the polarization preserving optical fibers.

Polarization maintaining optical fiber couplers, which are capable of dividing and combining light beams while maintaining the polarization directions thereof, are employed as the light dividing means 3 and the optical connector C1 in the optical tomography system 100. PANDA PBS's (Polarization maintaining AND Absorption reducing Polarization Beam Splitters) may be employed as the polarization preserving optical couplers, for example.

In the optical tomography system 100, optical links are established such that the polarization direction of the linearly polarized laser beam L emitted from the light source unit 10 and one of the polarization axes of the optical fiber PFB1 are matched. In addition, optical links are established such that the directions of the optical axes of the optical fibers PFB1, PFB2, PFB3, and PFB4 the optical axis of the light dividing means 3, and the optical axis of the optical connector C1 are all matched.

Figure 3:
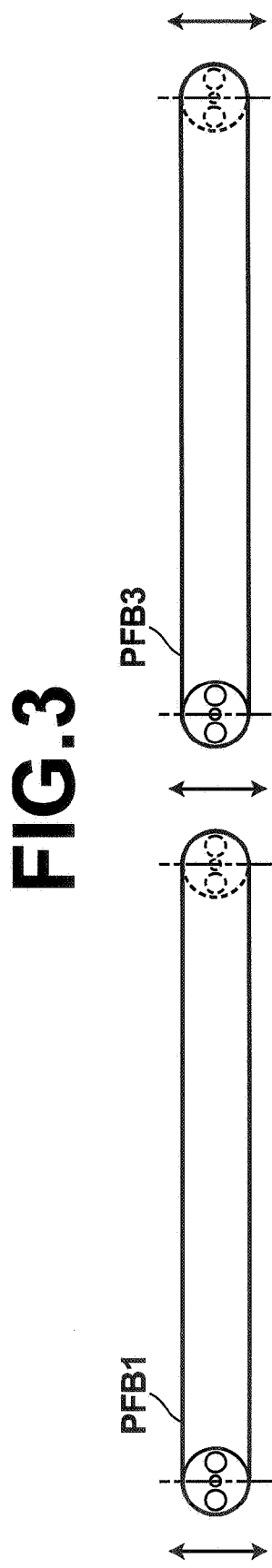
FIG. 3 is a schematic diagram that illustrates the directions of the optical axes of optical fibers that are optically linked, and the polarization direction of a linearly polarized light beam that propagates through the optical fibers.

FIG. 3 illustrates an example wherein the optical fiber PFB1 and the optical fiber PFB3 are optically linked such that the directions of the polarization axes thereof are matched, and the state of a linearly polarized light beam that propagates through the optical fibers PFB1 and PFB3. In FIG. 3, one of the optical axes of the optical fiber PFB1 and the optical fiber PFB3 is illustrated as broken lines, and the polarization direction of the linearly polarized light beam that enters and exits from the optical fibers is illustrated as arrows.

By adopting the configuration described above, the linearly polarized light beam emitted from the light source unit 10 reaches the light dividing means 3 via the optical fiber PFB1, while maintaining the polarization direction thereof. The reference light beam L2 enters the combining means 4 as a linearly polarized light beam, while maintaining the polarization direction thereof. The measuring light beam L1 also enters the optical connector C1 as a linearly polarized light beam, while maintaining the polarization direction thereof. Note that in FIG. 1, the two polarization axes of each of the optical fibers PFB1, PFB2, PFB3, PFB4, and PFB5 are parallel and perpendicular with respect to the surface of the drawing sheet. The polarization direction of the light beams that propagate through each of the optical fibers is assumed to be parallel to the surface of the drawing sheet, and illustrated schematically as the double headed vertically extending arrows.

The optical fibers PFB1, PFB2, PFB3, and PFB4 which are optically linked in the manner described above are fixed. However, the optical fiber PFB5 rotates integrally with the probe 30, and the directions of the polarization axes of the optical fiber PFB5 also rotate. In the case that linearly polarized light having a polarization direction different from that of the polarization axis of a polarization maintaining optical fiber enters the polarization maintaining optical fiber, the polarized state of the light beam changes as it propagates. The light beam may become right circular polarized light, left circular polarized light, or linear polarized light having a polarization different from the original polarization direction, depending on the distance that it propagates.

Figure 4:
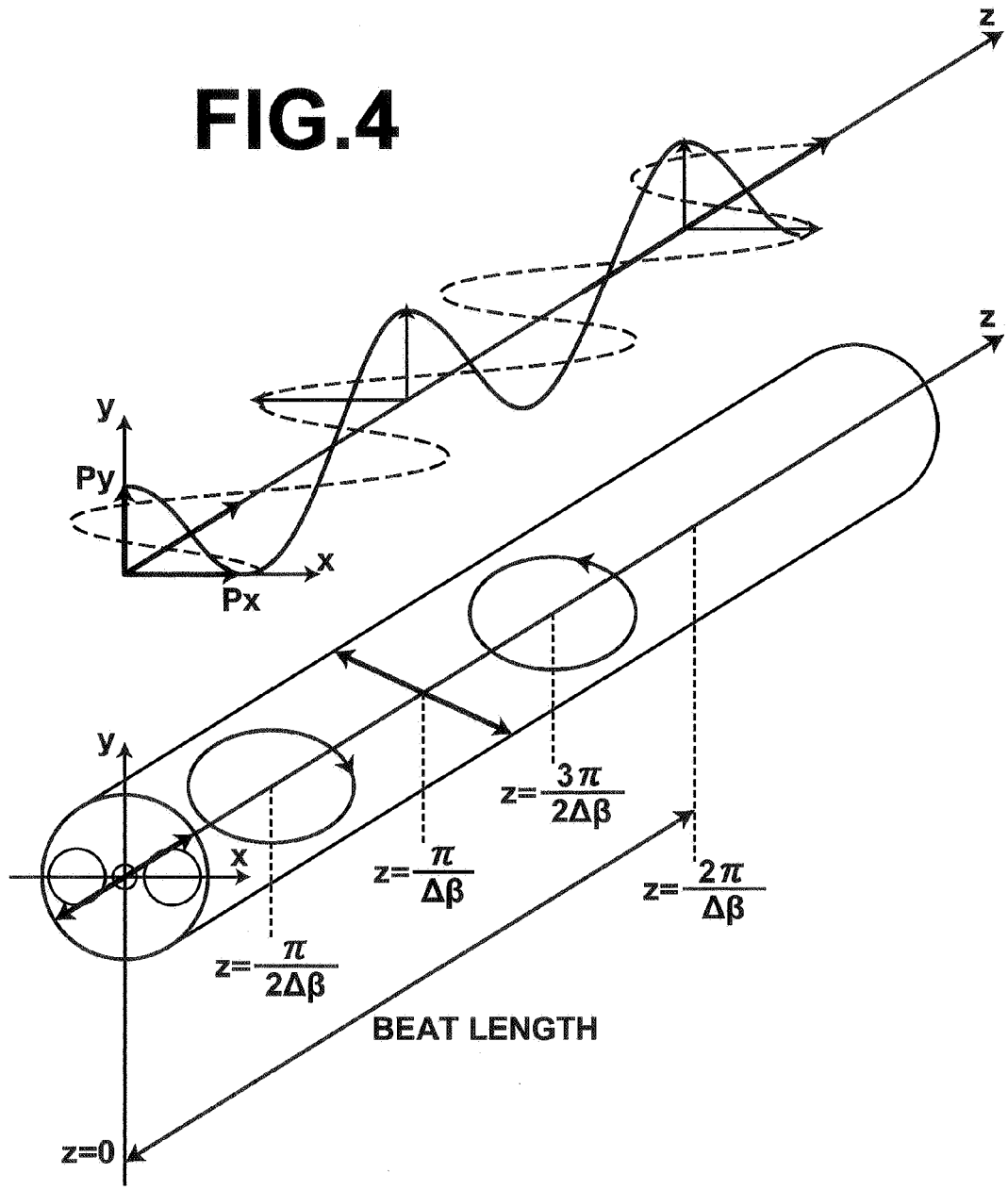
FIG. 4 is a schematic diagram that illustrates how linearly polarized light having a polarization direction at a 45° angle with respect to the polarization axis of a polarization maintaining optical fiber propagates through the polarization maintaining optical fiber, and the changes in the polarization state thereof.

FIG. 4 illustrates how linearly polarized light having a polarization direction at a 45° angle with respect to the polarization axis of a polarization maintaining optical fiber propagates through the polarization maintaining optical fiber, and the changes in the polarization state thereof. Note that in FIG. 4, the components of the incident linearly polarized light in the X axis direction and the Y axis direction are denoted as Px and Py, respectively. The direction perpendicular to the X axis and the Y axis described with reference to FIG. 2 is the direction in which the light propagates, and is denoted as the Z axis. As illustrated in FIG. 4, if the difference between propagation constants in the X axis direction and the Y axis direction is designated as $\Delta\beta$, the light becomes circular polarized light when the propagation distance is $\pi/2\Delta\beta$ and $2\pi/2\Delta\beta$. The light becomes linearly polarized light having a polarization direction perpendicular to the original polarization direction when the propagation distance is $\pi/\Delta\beta$. The light becomes linearly polarized light having a polarization direction which is the same as the original polarization direction when the propagation distance is $2\pi/\Delta\beta$. The length $2\pi/\Delta\beta$ is a length at which the phase difference between the Px and Py components becomes $2\pi$ (one period), and is referred to as the beat length. The birefringence B of the polarization maintaining optical fiber is expressed as $B=\Delta\beta/k$, wherein k is a wave number. Therefore, the beat length can be expressed as $\lambda/B$, wherein $\lambda$ is the wavelength of the light.

The optical fiber PFB5 is constructed such that the length thereof is an integer multiple of half the beat length. Thereby, when linearly polarized light enters the optical fiber PFB5, the light emitted therefrom is linearly polarized light having the same polarization direction if the length of the optical fiber PFB5 is 2n (n is an integer: 1, 2, 3 . . . ) times half the beat length, even if the optical fiber PFB5 is rotated. If the length of the optical fiber PFB5 is 2n−1 (n is an integer: 1, 2, 3 . . . ) times the beat length, the light emitted therefrom is linearly polarized light having a polarization direction perpendicular to the original polarization direction.

Figure 5:
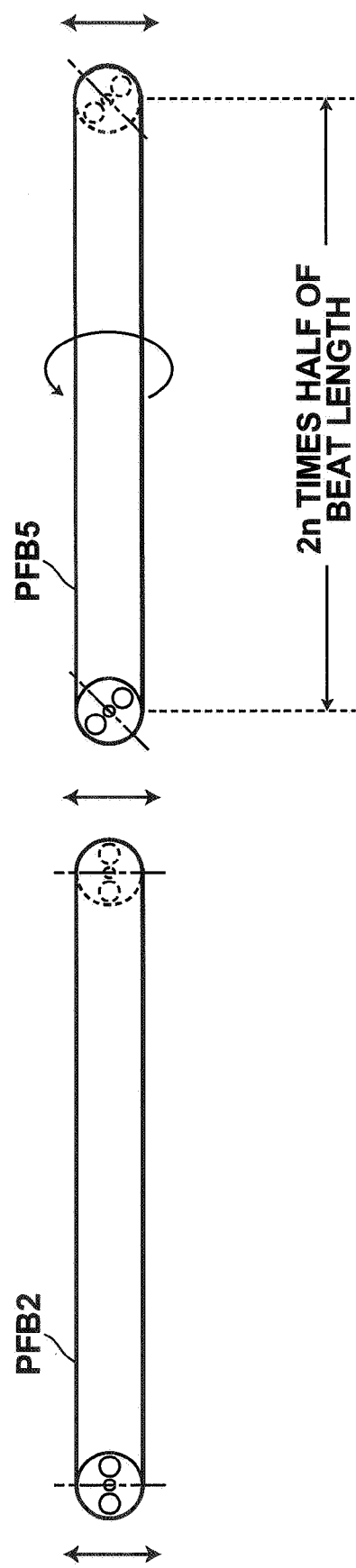
FIG. 5 is a schematic diagram that illustrates the directions of the optical axes of optical fibers that are optically linked, and the polarization direction of a linearly polarized light beam that propagates through the optical fibers.

FIG. 5 schematically illustrates the optical fiber PFB2 and the optical fiber PFB5, which are optically linked, and how linearly polarized light propagates therethrough when the length of the optical fiber PFB5 is 2n times half the beat length. Note that in FIG. 5, one of the polarization axes of the optical fiber PFB2 and the optical fiber PFB5 is illustrated by broken lines, and the polarization direction of the linearly polarized light that enters and is emitted from the optical fibers PFB2 and PFB5 is illustrated by double headed arrows. Because the length of the optical fiber PFB5 is an integer multiple of half the beat length, the light which is irradiated onto the measurement target S is always linearly polarized light having a stable polarization direction, even if the probe 30 is rotated.

If the polarization direction of the irradiated light is maintained during reflection by the measurement target S, the polarization directions of the measuring light beam L1 and the reflected light beam L3 within the optical connector C1 will match when the length of the optical fiber PFB5 is an integer multiple of half the beat length, as illustrated in FIG. 5. Alternatively, when the length of the optical fiber PFB5 is 2n−1 times half the beat length, the polarization directions of the measuring light beam L1 and the reflected light beam L3 rotate 90° within the optical fiber PFB5. As a result, the polarization directions of the measuring light beam L1 and the reflected light beam L3 within the optical connector C1 will match. Because the polarization directions of the measuring light beam L1 and the reference light beam L2 are matched, the polarization directions of the reference light beam L2 and the reflected light beam L3 will also match.

As described above, in the optical tomography system 100, the measuring light beam L1 irradiated onto the measurement target S is linearly polarized light having a uniform polarization direction, even if the probe 30 is rotated. Therefore, tomographic images having favorable image quality can be obtained stably. In addition, all of the optical fibers that function as waveguide means in the optical tomography system 100 are polarization maintaining optical fibers. Therefore, the polarization state of the light beams are maintained, regardless of whether forces such as bending and twisting are applied, or environmental temperature changes occur. Accordingly, the optical tomography system 100 can prevent variations in polarization states due to measurement environments, and is capable of stably and reproducibly obtaining tomographic images having favorable image quality. In addition, if the polarization direction of the measuring light beam L1 is maintained during reflection by the measurement target S, the polarization directions of the reference light beam L2 and the reflected light beam L3 will match. Therefore, the intensity of the interference light beam can be maximized. Further, the optical tomography system 100 does not employ a Faraday rotator or a polarization controller. Therefore, conventional problems related to control speed when the conventional polarization controllers are used, and problems related to cost when Faraday rotators are employed, can be avoided.

Hereinafter, the operation of the optical tomography system 100 having the above construction will be described. When obtaining a tomographic image, first, the movable stage 23 is moved in the direction of arrow A, to adjust the optical path length such that the measurement target S is positioned within a measurable region. Thereafter, the light beam L is emitted from the light source unit 10. The light beam L is divided into the measuring light beam L1 and the reference light beam L2 by the light dividing means 3. The measuring light beam L is guided within a body cavity from the optical probe 30, and irradiated on the measurement target S. The reflected light beam L3, which is reflected by the measurement target S, is combined with the reference light beam L2, which is reflected by the mirror 22, to form the interference light beam L4. The interference light beam L4 is detected by the interference light detecting means 40. The detected interference light beam L4 undergoes frequency analysis at the image obtaining means 50, to obtain a tomographic image. In the optical tomography system 100 that obtains tomographic images by SS-OCT measurement in this manner, image data is obtained for various depth positions based on the frequency and the intensity of the interference light beam L4. The movement of the mirror 22 in the direction of arrow A is employed to adjust the position at which tomographic image signals are obtained in the depth direction of the measurement target S.

The measuring light beam L1 may be scanned on the measurement target S in the X direction and the Y direction by driving the probe 30 to rotate in the peripheral direction thereof. In this case, data in the depth direction of the measurement target S can be obtained within the two dimensional scanned region. Thereby, tomographic images can be obtained in both the X and Y directions within the two dimensional scanned region.

Next, an optical tomography system 200 according to a second embodiment of the present invention will be described with reference to FIG. 4. Note that the optical tomography system 200 of the second embodiment is an SD-OCT apparatus that obtains tomographic images by SD-OCT measurement. The optical tomography system 200 differs from the optical tomography system 100 illustrated in FIG. 1 in the structures of the light source unit and the interference light detecting means. Components of the optical tomography system 200 illustrated in FIG. 4 which are the same as those of the optical tomography system 100 illustrated in FIG. 1 will be denoted with the same reference numerals, and detailed descriptions thereof will be omitted.

A light source unit 210 of the optical tomography system 200 comprises: a light source 211 that emits a low coherence light beam, such as an SLD (Super Luminescent Diode) or an ASE (Amplified Spontaneous Emission); and an optical system 212 that causes the light beam emitted from the light source 211 to enter the optical fiber PFB1. Note that the optical tomography system 200 obtains tomographic images of measurement targets S, which are living tissue within body cavities. Therefore, it is preferable to employ a short pulse laser light source that emits light within a wide spectral bandwidth, so that attenuation of the light beam due to scattering and absorption as it passes through the measurement target S can be minimized.

Meanwhile, a interference light detecting means 240 detects the interference light beam L4, formed by the combining means 4 combining the reflected light beam L3 and the reference light beam L2. The interference light detecting means 240 comprises: a spectral decomposing means 242, for decomposing the interference light beam L4 into each of its constituent wavelength bands; and a photodetecting means 244, for detecting each wavelength band of the interference light beam L4. The spectral decomposing means 242 is constituted by a diffraction grating element or the like. The spectral decomposing means 242 decomposes the interference light beam L4 incident thereon, and emits the decomposed components toward the photodetecting means 244.

The photodetecting means 244 is constituted by optical sensors such as CCD elements, which are arranged one dimensionally or two dimensionally. Each of the optical sensors is configured to detect each wavelength band component of the spectrally decomposed interference light beam L4, incident thereon via an optical lens 243. Here, the interference light beam L4, in which Fourier transformed functions of reflective data are added to the spectrum of the light source unit 210, is observed. The image obtaining means 50 performs frequency analysis on the interference light beam L4 detected by the interference light detecting means 40, to obtain reflective data at various depth positions within the measurement target S, and to generate tomographic images. The display device 60 displays the generated tomographic images.

In the optical tomography system 200 as well, the optical fibers PFB1, PFB2, PFB3, PFB4, and PFB5 are all polarization maintaining optical fibers. In addition, the light dividing means 3 and the optical connector C1 are polarization maintaining optical fiber couplers. Optical links are established such that the polarization direction of the linearly polarized laser beam L emitted from the light source unit 210 and one of the polarization axes of the optical fiber PFB1 are matched. Further, optical links are established such that the directions of the optical axes of the optical fibers PFB1, PFB2, PFB3, and PFB4, the optical axis of the light dividing means 3, and the optical axis of the optical connector C1 are all matched.

Accordingly, the optical tomography system 200 of the second embodiment described above can obtain advantageous effects similar to those of the optical tomography system 100 of the first embodiment. That is, the measuring light beam L1 irradiated onto the measurement target S is linearly polarized light having a uniform polarization direction, even if the probe 30 is rotated, and tomographic images having favorable image quality can be obtained stably.

Figure 6:
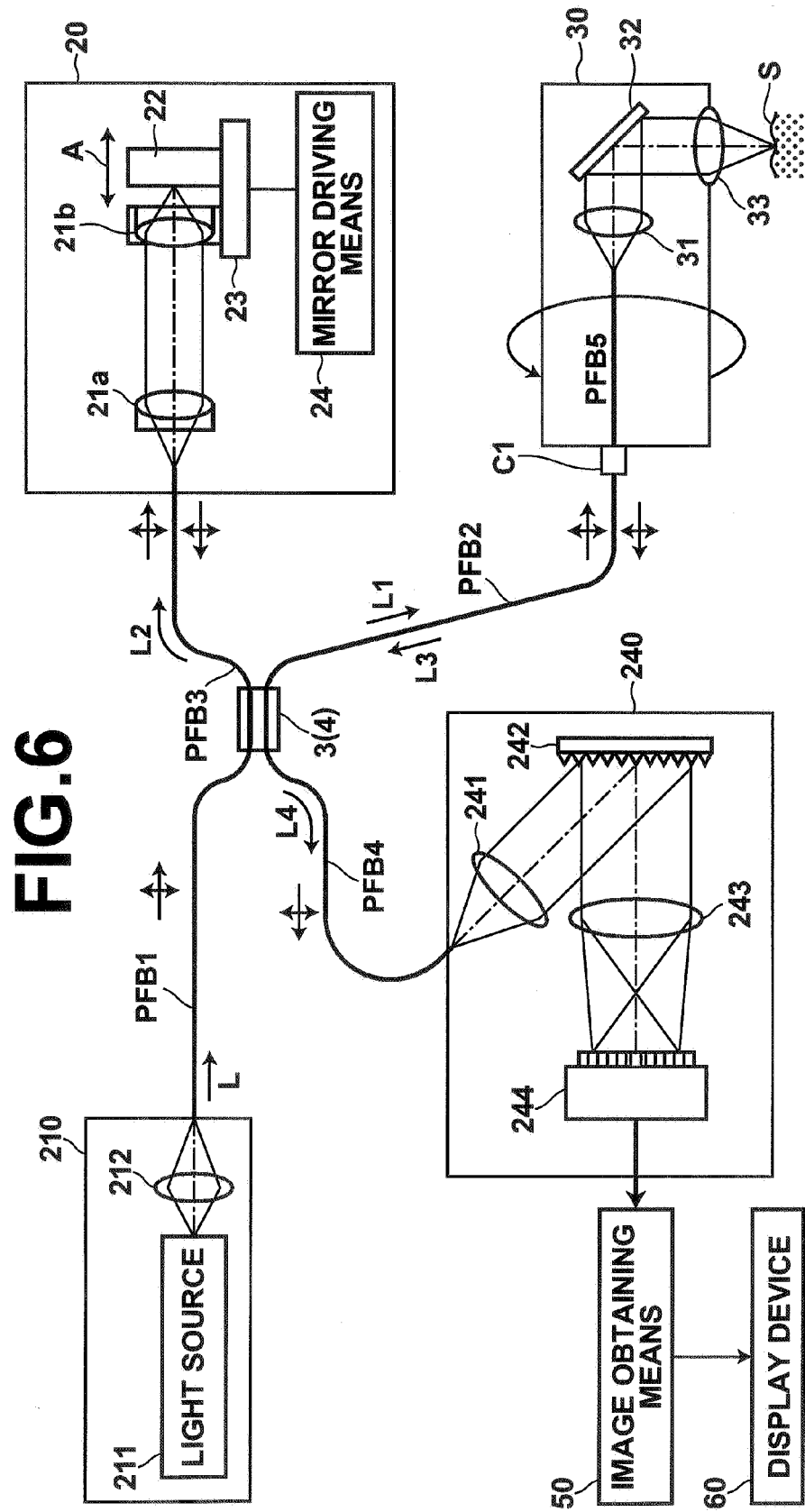
FIG. 6 is a diagram that illustrates the construction of an optical tomography system according to an exemplary embodiment of the present invention.
Figure 7:
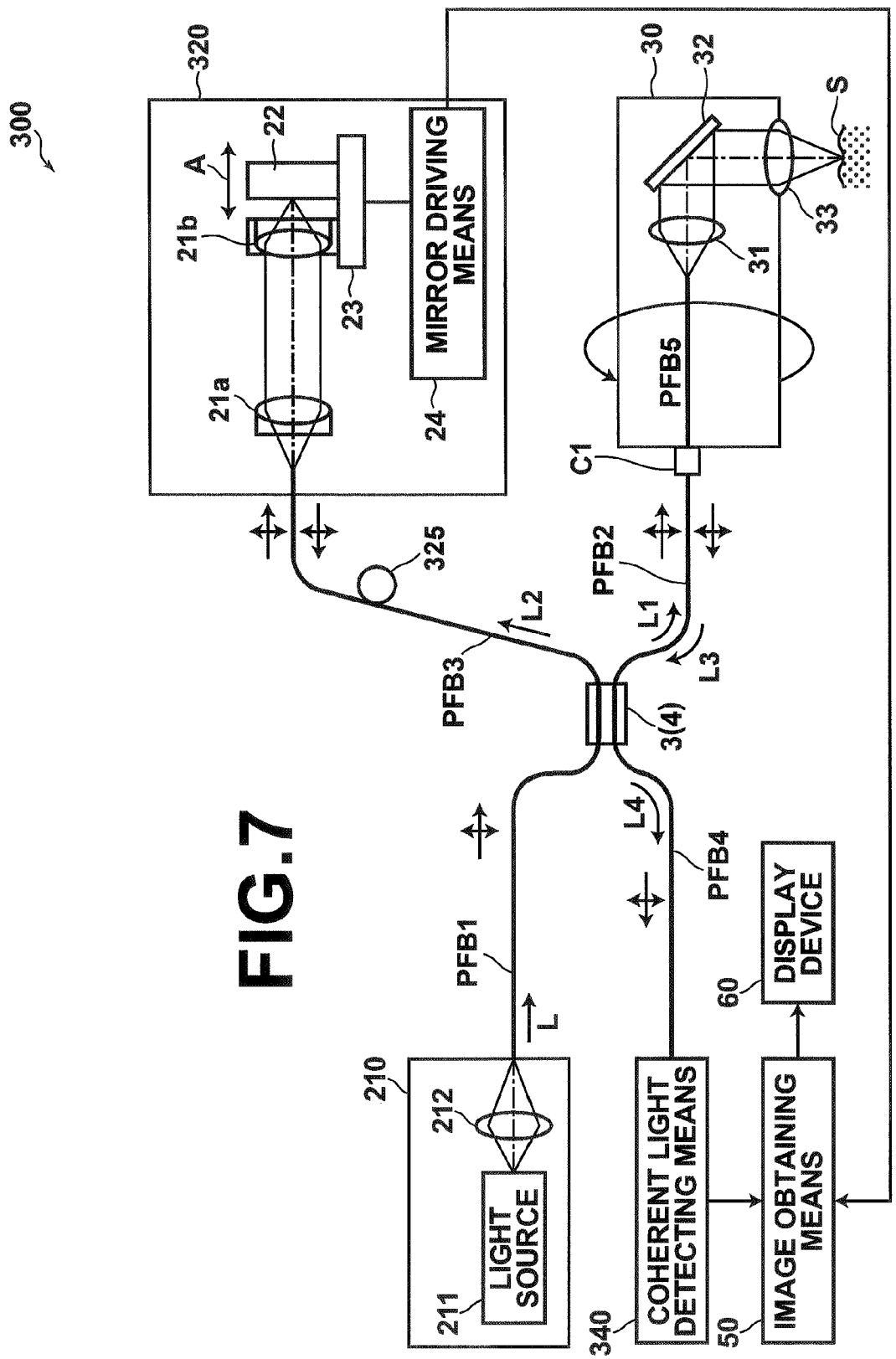
FIG. 7 is a diagram that illustrates the construction of an optical tomography system according to an exemplary embodiment of the present invention.

Next, an optical tomography system 300 according to a third embodiment of the present invention will be described with reference to FIG. 7. Note that the optical tomography system 300 of the second embodiment is a TD-OCT apparatus that obtains tomographic images by TD-OCT measurement. The optical tomography system 300 differs from the optical tomography system 200 illustrated in FIG. 6 in the functions of the optical path length adjusting means and the interference light detecting means. Components of the optical tomography system 300 illustrated in FIG. 7 which are the same as those of the optical tomography system 200 illustrated in FIG. 6 will be denoted with the same reference numerals, and detailed descriptions thereof will be omitted.

An optical path length adjusting means 320 of the optical tomography system 300 has the same structure as the optical path length adjusting means 20 of the optical tomography system 100, but functions to change the optical path length of the reference light beam L2, in order to vary measuring positions within the measurement target S in the depth direction thereof. Further, a phase modulator 325 is provided along the optical path (the optical fiber PFB3) of the reference light beam L2, in the optical tomography system 300. The phase modulator 325 functions to slightly shift the frequency of the reference light beam L2. The reference light beam L2, of which the optical path length has been changed by the optical path length adjusting means 320 and the frequency has been shifted by the phase modulator 325, is guided to the combining means 4.

A interference light detecting means 340 of the optical tomography system 300 detects the intensity of the interference light beam L4 by heterodyne detection, for example. Specifically, if the sum of the optical path lengths of the measuring light beam L1 and the reflected light beam L3 is equal to the optical path length of the reference light beam L2, a beat signal that repetitively waxes and wanes at a difference frequency between the frequencies of the reference light beam L2 and the reflected light beam L3 is generated. As the optical path length of the reference light beam L2 is varied by the optical path length adjusting means 320, the measurement position (depth) within the measurement target S changes. The interference light detecting means 340 detects a plurality of beat signals at each measuring position. Note that data regarding the measuring positions is output to the image obtaining means 50 from the optical path adjusting means 320. Tomographic images are generated based on the beat signals detected by the interference light detecting means 340 and the data regarding the measuring positions from the mirror moving means 24. The display device 60 displays the generated tomographic images.

In the optical tomography system 300 as well, the optical fibers PFB1, PFB2, PFB3, PFB4, and PFB5 are all polarization maintaining optical fibers. In addition, the light dividing means 3 and the optical connector C1 are polarization maintaining optical fiber couplers. Optical links are established such that the polarization direction of the linearly polarized laser beam L emitted from the light source unit 210 and one of the polarization axes of the optical fiber PFB1 are matched. Further, optical links are established such that the directions of the optical axes of the optical fibers PFB1, PFB2, PFB3, and PFB4, the optical axis of the light dividing means 3, and the optical axis of the optical connector C1 are all matched.

Accordingly, the optical tomography system 300 of the third embodiment described above can obtain advantageous effects similar to those of the optical tomography system 100 of the first embodiment. That is, the measuring light beam L1 irradiated onto the measurement target S is linearly polarized light having a uniform polarization direction, even if the probe 30 is rotated, and tomographic images having favorable image quality can be obtained stably.

Figure 8:
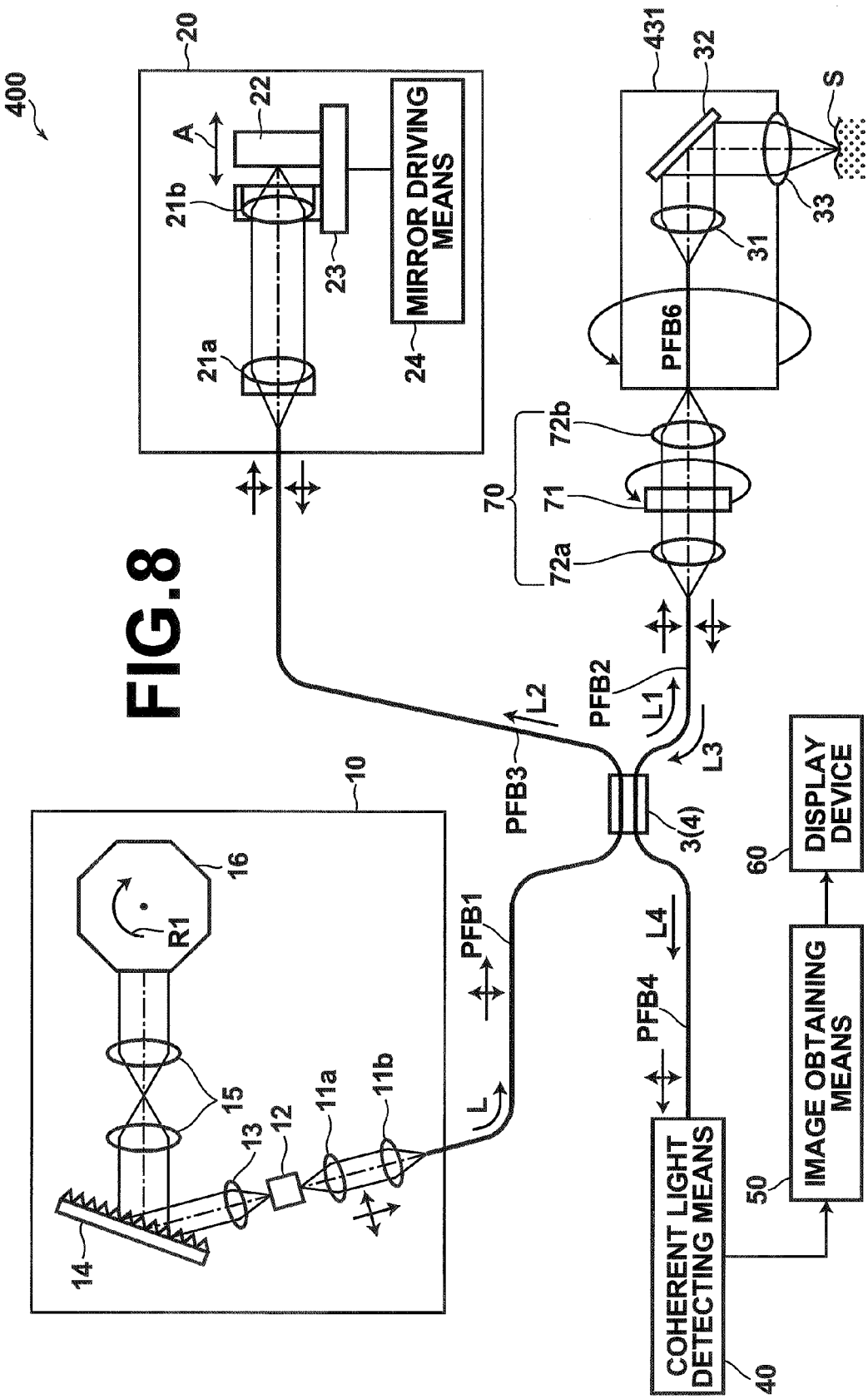
FIG. 8 is a diagram that illustrates the construction of an optical tomography system according to an exemplary embodiment of the present invention.

Next, an optical tomography system 400 according to a fourth embodiment of the present invention will be described with reference to FIG. 8. Note that the optical tomography system 400 of the tenth embodiment differs from the optical tomography system 100 illustrated in FIG. 1 in that a probe 431 is employed instead of the probe 30, and that a polarization direction rotating means 70 is provided between the probe 431 and the light dividing means 3. Components of the optical tomography system 400 illustrated in FIG. 8 which are the same as those of the optical tomography system 100 illustrated in FIG. 1 will be denoted with the same reference numerals, and detailed descriptions thereof will be omitted.

The probe 431 differs from the probe 30 in that an optical fiber PFB6 is employed instead of the optical fiber PFB5. The optical fiber PFB6 is a polarization maintaining optical fiber like the optical fiber PFB5, but the length thereof is not particularly defined. The entire probe 431 is rotatable in the circumferential direction of the optical fiber PFB6, in the same manner as the probe 30.

The polarization direction rotating means 70 comprises: a ½ wavelength plate 71; and two collimating lenses 72a and 72b, which are provided on both sides of the ½ wavelength plate 71. The ½ wavelength plate 71 has a unique polarization axis. The ½ wavelength plate 71 functions to rotate the polarization direction of linearly polarized light, while maintaining the linearly polarized state thereof. If the ½ wavelength plate 71 are rotated by an angle of θ, linearly polarized light beams incident thereon are emitted as linearly polarized light beams having polarization directions rotated 2θ from their original polarization directions. In the optical tomography system 400, the ½ wavelength plate 71 is configured to be rotatable about the optical axis thereof.

Figure 9:
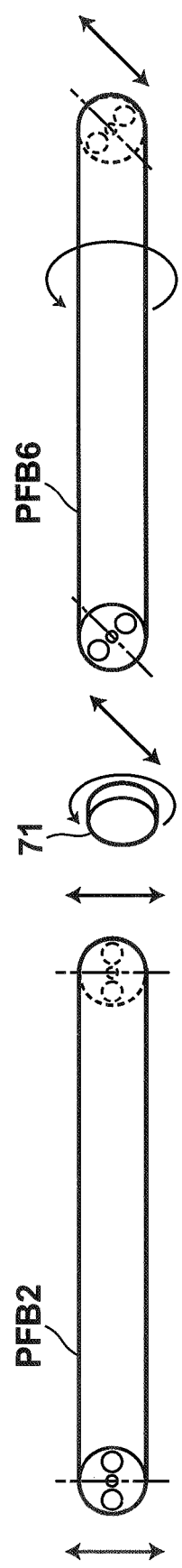
FIG. 9 is a schematic diagram that illustrates the directions of the optical axes of optical fibers that are optically linked, and the polarization direction of a linearly polarized light beam that propagates through the optical fibers.

FIG. 9 is a schematic diagram that illustrates the optical fiber PFB2, the ½ wavelength plate 71, the optical fiber PFB6, and how linearly polarized light propagates therethrough. The optical fiber PFB6 rotates with the probe 931, and a control means (not shown) rotates the ½ wavelength plate 71 in order to maintain a state in which the polarization direction of the linearly polarized light that enters the optical fiber PFB6 and a polarization axis of the optical fiber PFB6 are matched. Specifically, the rotating speed of the ½ wavelength plate 71 is controlled to be ½ the rotating speed of the probe 431. Due to the above structure, the light which is irradiated onto the measurement target S from the optical fiber PFB6 is necessarily linearly polarized light having a stable polarization direction, even if the probe 931 is rotated. Note that in FIG. 9, one of the polarization axes of the optical fiber PFB2 and the optical fiber PFB6 is illustrated by broken lines, and the polarization direction of the linearly polarized light that enters and is emitted from the optical fibers PFB2 and PFB6 is illustrated by double headed arrows.

As described above, the optical tomography system 400 of the fourth embodiment can obtain advantageous effects similar to those of the optical tomography system 100 of the first embodiment. That is, the measuring light beam L1 irradiated onto the measurement target S is linearly polarized light having a uniform polarization direction, even if the probe 431 is rotated, and tomographic images having favorable image quality can be obtained stably.

Figure 10:
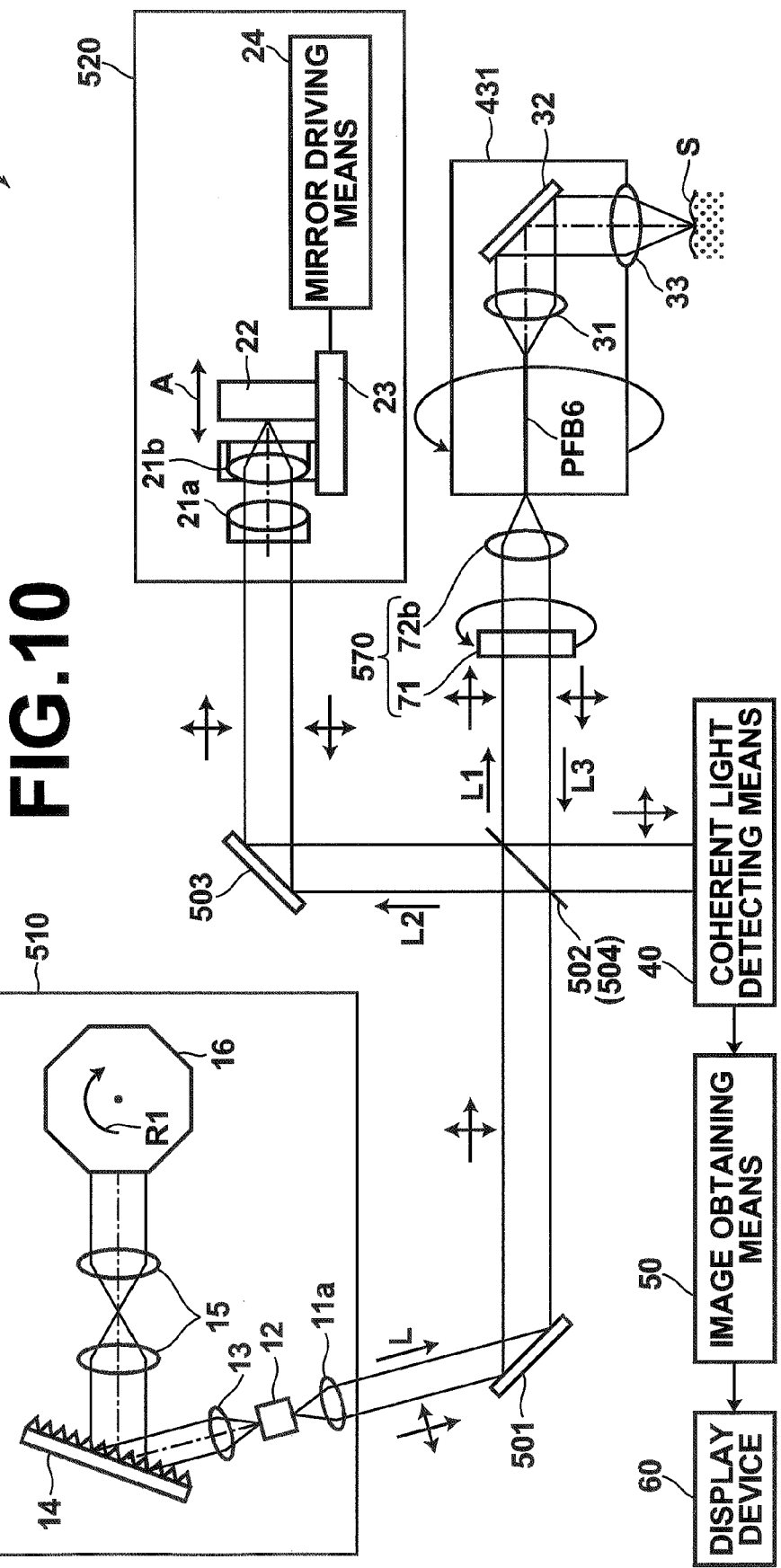
FIG. 10 is a diagram that illustrates the construction of an optical tomography system according to an exemplary embodiment of the present invention.

Next, an optical tomography system 500 according to a fifth embodiment of the present invention will be described with reference to FIG. 10. Note that the optical tomography system 500 of the fifth embodiment differs from the optical tomography system 400 illustrated in FIG. 8 in that optical paths outside the light source unit are constituted by bulk optical systems. In FIG. 10, components which are the same as those of the optical tomography system 100 of FIG. 1 and the optical tomography system 400 of FIG. 8 are denoted with the same reference numerals, and detailed descriptions thereof will be omitted.

The optical tomography system 500 comprises: a light source unit 510, for emitting a light beam L; a light dividing means 502, for dividing the light beam L emitted from the light source unit 510 into a measuring light beam L1 and a reference light beam L2; an optical path length adjusting means 520, for adjusting the optical path length of the reference light beam L2 output by the light dividing means 502; a probe 431, for guiding the measuring light beam L1 output by the light dividing means 3 to a measurement target S; a combining means 504, for combining a reflected light beam L3, which is the measuring light beam reflected by the measurement target S, and the reference light beam L2; a interference light detecting means 40, for detecting a interference light beam L4, which is the reflected light beam L3 and the reference light beam L2 which are combined by the combining means 4; an image obtaining means 50, for obtaining a tomographic image of the measurement target S by performing frequency analysis on the interference light beam L4 detected by the interference light detecting means 40, and a polarization direction rotating means 570, for rotating the polarization direction of the measuring light beam L1 that enters the probe 431.

The light source unit 510 is of the same construction as the light source unit 10 of FIG. 1, except that the lens lib has been omitted therefrom. The optical path length adjusting means 520 is of the same construction as the optical path length adjusting means 20 of FIG. 1, except that the first optical lens 21a has been omitted therefrom. The polarization direction rotating means 570 is of the same construction as the polarization direction rotating means 70 of FIG. 8, except that the collimating lens 72a has been omitted therefrom. All of these components are configured to either emit or receive collimated light.

The light dividing means 502 also functions as the combining means 504, and is a beam splitter that divides and combines light beams based on a predetermined light amount ratio. Note that a plate shaped beam splitter is illustrated in FIG. 10. Alternatively, a cube shaped beam splitter may be employed. Mirrors 501 and 503 are provided between the light source unit 510 and the light dividing means 502, and between the light dividing means 502 and the optical path length adjusting means 520, respectively.

In the optical tomography system 500 as well, the ½ wavelength plate 71 is configured to be rotatable about its optical axis, in the same manner as in the optical tomography system 400. The ½ wavelength plate 71 is rotated by a control means (not shown) accompanying rotation of the probe 431, in order to maintain a state in which the polarization axis of the optical fiber PFB6 and the polarization direction of the linearly polarized light that enters the optical fiber PFB6 from the polarization direction rotating means 70.

Accordingly, the optical tomography system 500 of the fifth embodiment can obtain advantageous effects similar to those of the optical tomography system 100 of the first embodiment. That is, the measuring light beam L1 irradiated onto the measurement target S is linearly polarized light having a uniform polarization direction, even if the probe 431 is rotated, and tomographic images having favorable image quality can be obtained stably. In addition, the polarization maintaining optical fiber is employed within the probe, and the bulk optical systems are employed in the other portions of the optical path. Therefore, variations in the polarization state due to measurement environments can be prevented, and the optical tomography system 500 is capable of stably and reproducibly obtaining tomographic images having favorable image quality.

Next, an optical tomography system 600 according to a sixth embodiment of the present invention will be described with reference to FIG. 11. Note that the optical tomography system 600 of the sixth embodiment enables measurement of the optical rotatory power of the measurement target S. The optical tomography system 600 differs from the optical tomography system 400 illustrated in FIG. 8 in that an optical path length adjusting means 620 equipped with a ½ wavelength plate 27 is employed instead of the optical path length adjusting means 20, and also in the structure of a interference light detecting means 640. Components of the optical tomography system 600 illustrated in FIG. 11 which are the same as those of the optical tomography system 400 illustrated in FIG. 8 will be denoted with the same reference numerals, and detailed descriptions thereof will be omitted.

Figure 12:
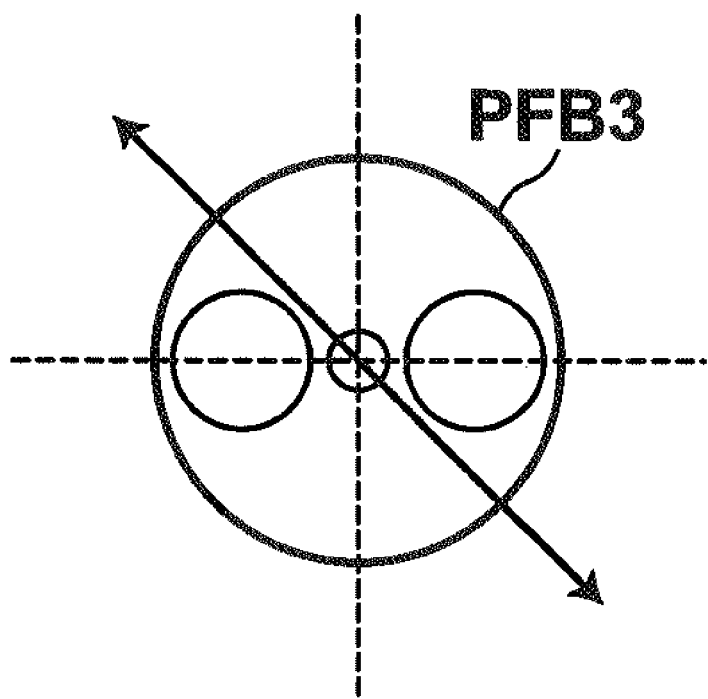
FIG. 12 is a diagram that illustrates the directions of the polarization axes of an optical fiber and the polarization direction of a light beam incident thereon.

The optical path length adjusting means 620 is of a structure wherein the ½ wavelength plate 27 is provided between the first optical lens 21*a* and the second optical lens 21*b*. Here, the direction of the polarization axis of the ½ wavelength plate 27 is set such that the polarization direction of the light beam that enters the optical fiber PFB3 from the optical path length adjusting means 620 forms a 45° angle with respect to the direction of the polarization axis of the optical fiber PFB3. That is, the direction of the polarization axis of the ½ wavelength plate 27 is set such that it forms a 45° angle with respect to the polarization direction of the measuring light beam L1 that propagates through the optical fiber PFB2. In FIG. 12, the two optical axes of the optical fiber PFB3 are illustrated as broken lines, and the polarization direction of the linearly polarized reference light beam L2 emitted from the optical path length adjusting means 620 toward the optical fiber PFB3 is illustrated as a double headed arrow.

Figure 11:
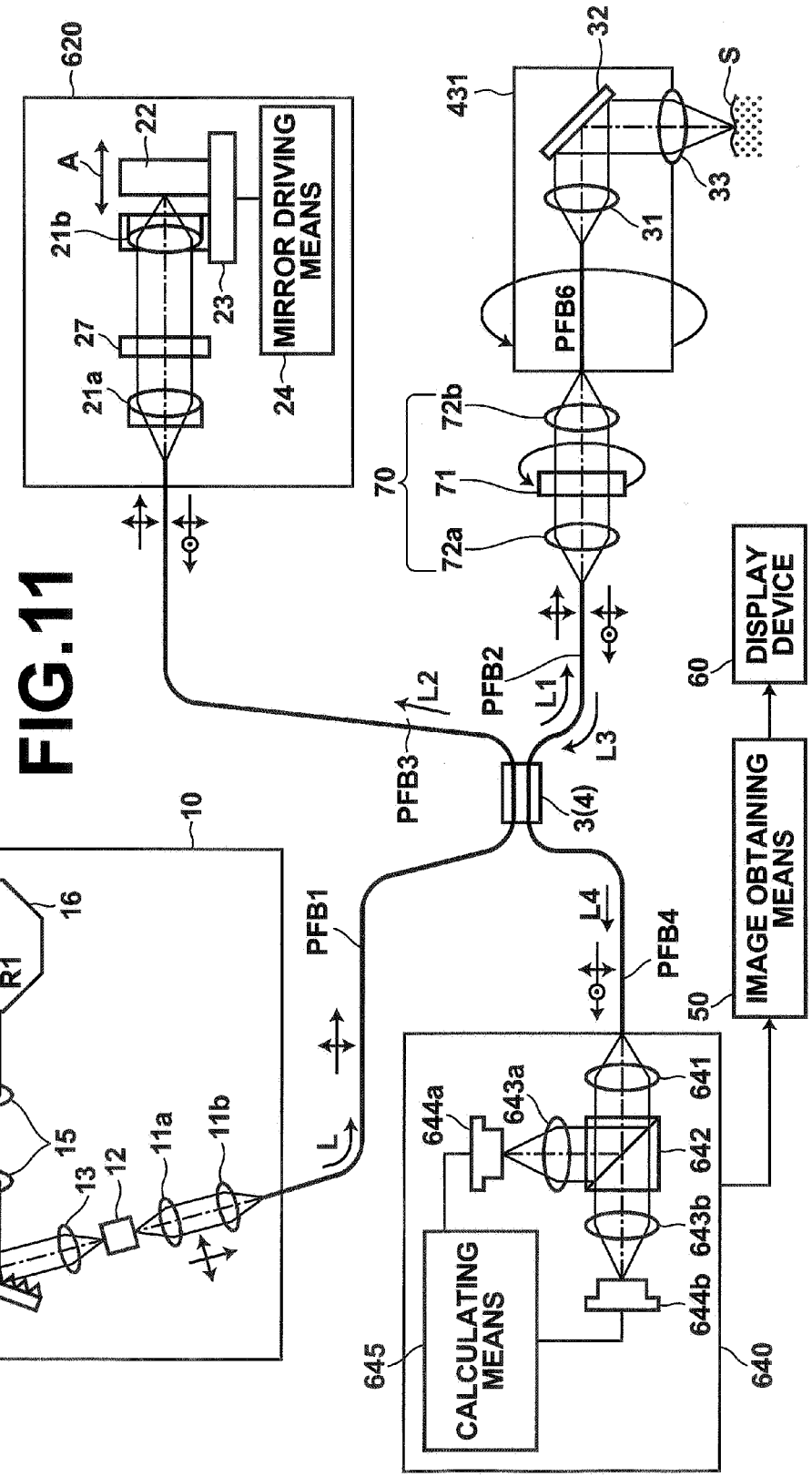
FIG. 11 is a diagram that illustrates the construction of an optical tomography system according to an exemplary embodiment of the present invention.

Note that in FIG. 11, the two polarization axes of each of the optical fibers PFB1, PFB2, PFB3, and PFB4 are parallel and perpendicular with respect to the surface of the drawing sheet. The polarization direction of the laser beam L emitted from the light source unit 10 and the polarization direction of the measuring light beam L1 that propagates through the optical fiber PFB2 are assumed to be parallel to the surface of the drawing sheet. Accordingly, the reference light beam L2 that enters the optical fiber PFB3 includes a polarized light component, of which the polarization direction is parallel to the surface of the drawing sheet (hereinafter, referred to as "horizontal polarized light"), and a polarized light component, of which the polarization direction is perpendicular to the surface of the drawing sheet (hereinafter, referred to as "perpendicular polarized light").

In the case that the measurement target S does not have optical rotatory power, the reflected light beam L3 will be light having the same polarization direction as that of the measuring light beam L1. In the case that the measurement target S has optical rotatory power, the polarization direction of the reflected light beam L3 will be rotated from that of the measuring light beam L1. Therefore, the reflected light beam L3 that propagates through the optical fiber PFB2 will include both a horizontal polarized light component and a perpendicular polarized light component. In this case, the horizontal polarized light components and the perpendicular polarized light components of the reference light beam L2 and the reflected light beam L3 respectively interfere with each other in the combining means 4, and the resulting interference light beam L4 is detected by the interference light detecting means 640.

The interference light detecting means 640 of the optical tomography system 600 comprises: a collimating lens 641, for collimating light emitted from the optical fiber PFB4; a polarizing beam splitter 642; two condensing lenses 643*a* and 643*b*; two photodetectors 644*a* and 644*b*; and calculating means 645.

The interference light beam L4 that enters the interference light detecting means 640 is collimated by the collimating lens 641, then separated into P polarized light and S polarized light by the polarizing beam splitter 642. As illustrated in FIG. 9, the P polarized light and the S polarized light correspond to horizontal polarized light and perpendicular polarized light, respectively. The S polarized light reflected by the polarizing beam splitter 642 is condensed by the condensing lens 643*a*, then enters the photodetector 644*a*. The P polarized light which is transmitted through the polarizing beam splitter 642 is condensed by the condensing lens 643*b*, then enters the photodetector 644*b*. The outputs of the photodetectors 644*a* and 644*b* are sent to the calculating means 645. The calculating means 645 performs calculation processes on each of the P polarized and S polarized light, to detect the polarization properties of the measurement target S. The calculation results of the calculating means 645 are sent to the image obtaining means 50. The analysis that follows thereafter is the same as that described in the first embodiment, except that the P polarized light and the S polarized light are processed separately.

The amount of rotation of the polarization direction of the reflected light beam L3 depends on the optical rotatory power of the measurement target S. The amount of rotation is expressed in the intensity ratio between the horizontal polarized light component and the perpendicular polarized light component. Therefore, the optical rotatory power of the measurement target S can be measured, by the interference light detecting means analyzing the P polarized light and the S polarized light separately.

As described above, the optical tomography system 600 can obtain advantageous effects similar to those of the optical tomography system 100 of the first embodiment. That is, the measuring light beam L1 irradiated onto the measurement target S is linearly polarized light having a uniform polarization direction, even if the probe 431 is rotated, and tomographic images having favorable image quality can be obtained stably. In addition, the optical tomography system 600 can also measure the optical rotatory power of the measurement target S.

Figure 13:
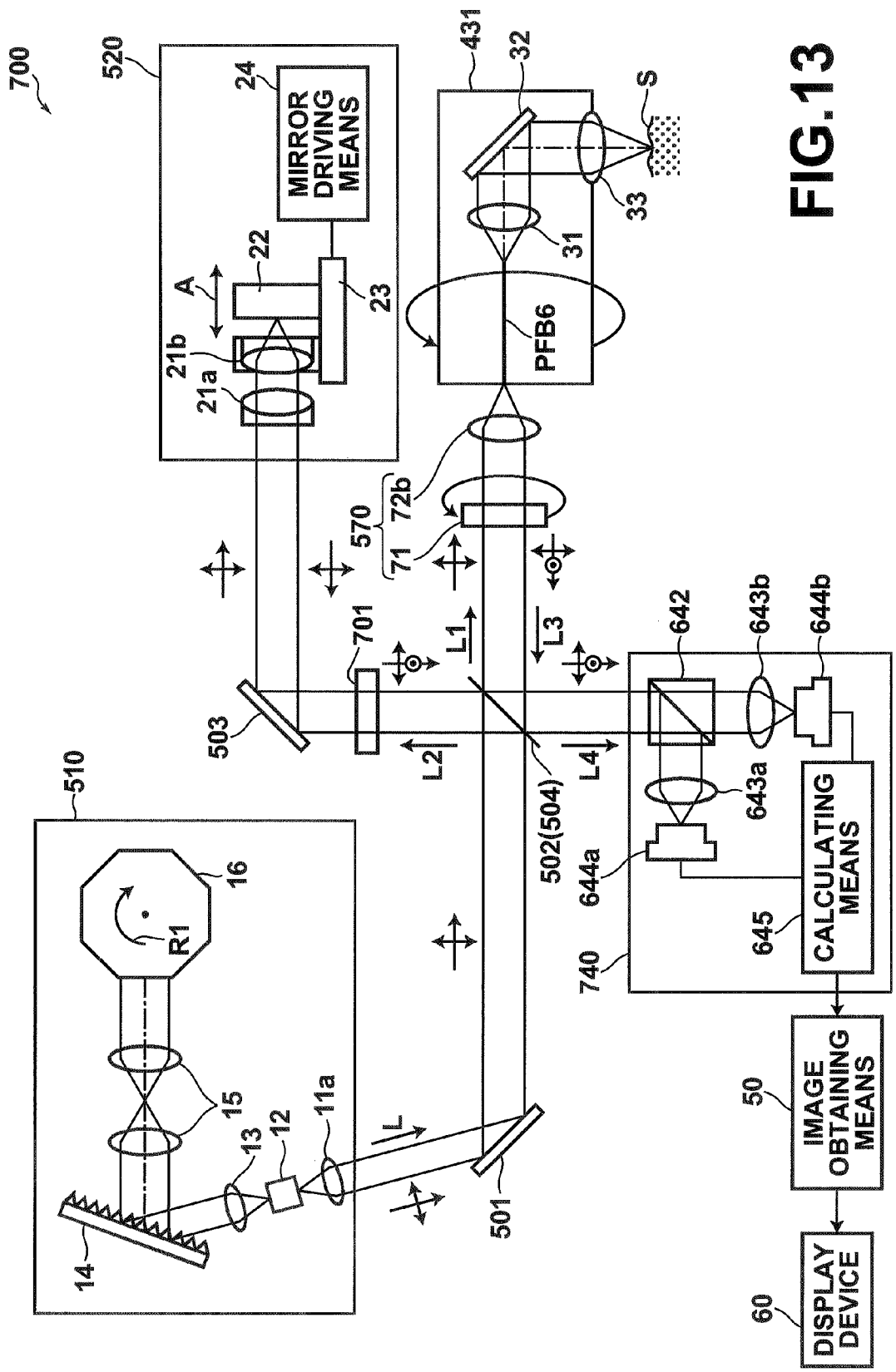
FIG. 13 is a diagram that illustrates the construction of an optical tomography system according to an exemplary embodiment of the present invention.

Next, an optical tomography system 700 according to a seventh embodiment of the present invention will be described with reference to FIG. 13. The optical tomography system 700 employs the same bulk optical systems as those of the optical tomography system 500 of FIG. 10, to realize the functions of the optical tomography system 600 of FIG. 11. Components of the optical tomography system 700 illustrated in FIG. 13 which are the same as those of the optical tomography system 500 illustrated in FIG. 10 and the optical tomography system 600 of FIG. 11 are denoted with the same reference numerals, and detailed descriptions thereof will be omitted.

Specifically, the optical tomography system 700 is of a similar structure as the optical tomography system 500, except that: a ½ wavelength plate 701 is added between the light dividing means 502 and the mirror 503; and a interference light detecting means 740 is employed instead of the interference light detecting means 40. The interference light detecting means 740 is similar to the interference light detecting means 640 of the optical tomography system 600 illustrated in FIG. 11, except that the collimating lens 641 has been omitted.

The polarization axis of the ½ wavelength plate 701 is set with respect to the polarization direction of the light beams incident thereon, in a similar manner as the ½ wavelength plate 27 of the optical tomography system 600. That is, the ½ wavelength plate 701 is set such that the polarization direction of the reference light beam L2 that enters the combining means 504 from the ½ wavelength plate 701 forms a 45° angle with the measuring light beam L1 that enters the polarization direction rotating means 570 from the light dividing means 502. Thereby, the light that enters the combining means 504 from the ½ wavelength plate 701 includes both horizontal polarized light and perpendicular polarized light.

In the optical tomography system 700 as well, in the case that the measurement target S has optical rotatory power, the polarization direction of the reflected light beam L3 will be rotated from that of the measuring light beam L1. Therefore, the reflected light beam L3 that propagates from the polarization direction rotating means 570 to the combining means 504 will include both a horizontal polarized light component and a perpendicular polarized light component. In this case, the horizontal polarized light components and the perpendicular polarized light components of the reference light beam L2 and the reflected light beam L3 respectively interfere with each other in the combining means 504, and the resulting interference light beam L4 is detected by the interference light detecting means 740.

The interference light beam L4 that enters the interference light detecting means 740 is separated into P polarized light and S polarized light by the polarizing beam splitter 642. Then, the P polarized light and the S polarized light are analyzed separately by the same processes as those performed by the interference light detecting means 640, to measure the optical rotatory power of the measurement target S.

Accordingly, the optical tomography system 700 can obtain advantageous effects similar to those of the optical tomography system 100 of the first embodiment. That is, the measuring light beam L1 irradiated onto the measurement target S is linearly polarized light having a uniform polarization direction, even if the probe 431 is rotated, and tomographic images having favorable image quality can be obtained stably. In addition, the optical tomography system 700 can also measure the optical rotatory power of the measurement target S.

Figure 14:
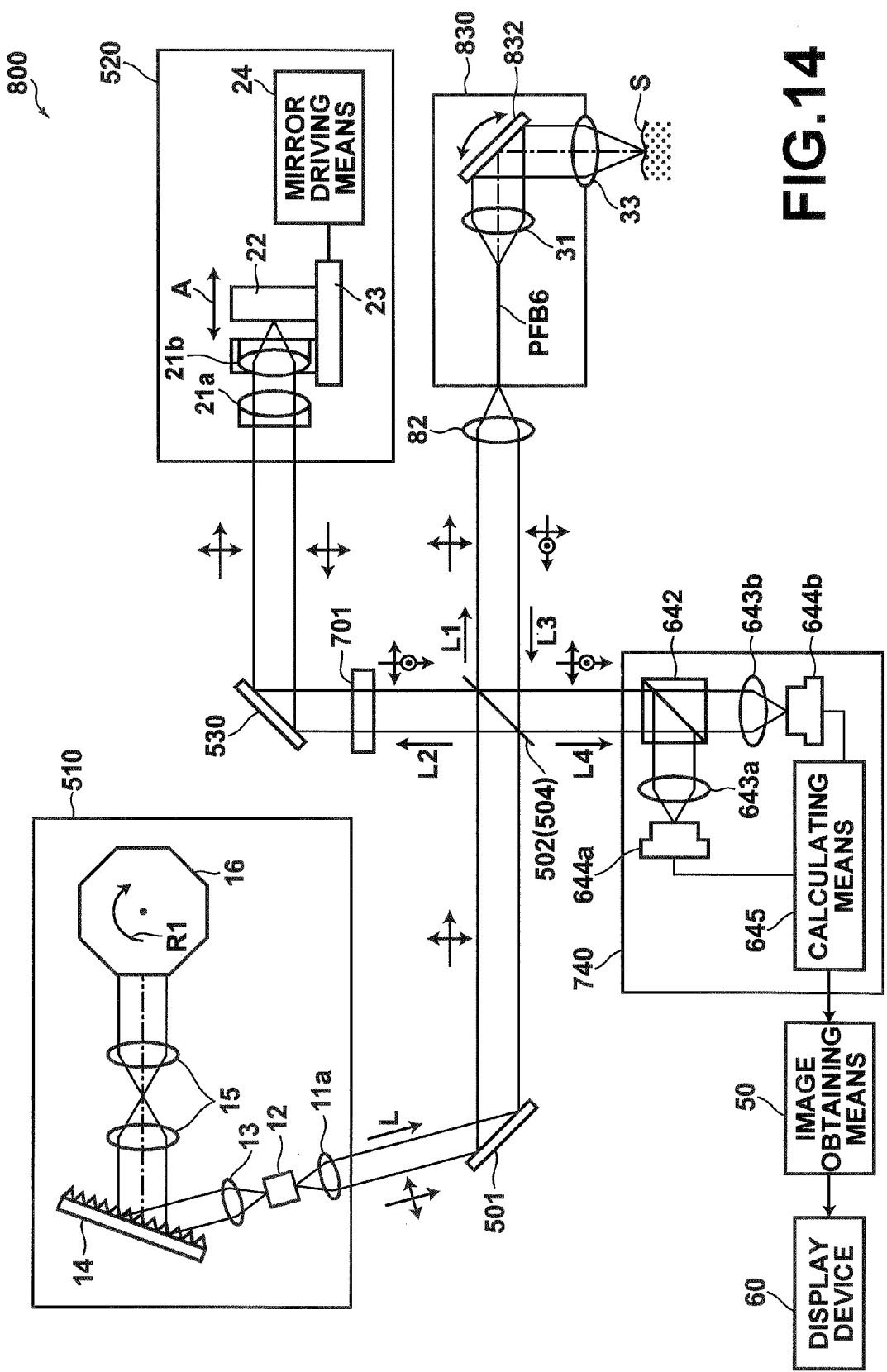
FIG. 14 is a diagram that illustrates the construction of an optical tomography system according to an exemplary embodiment of the present invention.

Next, an optical tomography system 800, which is a modification of the optical tomography system 700 of FIG. 13, will be described with reference to FIG. 14. Note that the optical tomography system 800 is capable of measuring the optical rotatory power of the measurement subject S. The optical tomography system 800 differs from the optical tomography system 700 of FIG. 13 in that: a probe 830 that does not rotate is employed instead of the probe 431; and a polarization direction rotating means is not provided. In FIG. 14, components of the optical tomography system 800 which are the same as those of the optical tomography system 700 of FIG. 13 are denoted with the same reference numerals, and detailed descriptions thereof will be omitted.

The probe 830 comprises: a probe outer cylinder, which has a closed distal end; an optical fiber PFB6, which is provided to extend along the axial direction of the outer cylinder within the interior space thereof; a collimating lens 31, for collimating the measuring light beam L1 emitted from the tip of the optical fiber PFB21; a scanning mirror 832, for reflecting the measuring light beam L1, which has been collimated by the collimating lens 31; and a condensing lens 33, for condensing the measuring light beam L1 reflected by the scanning mirror 32 such that it converges within the measurement target S. The probe 830 differs from the probe 431 in that it is not configured to be rotatable in the circumferential direction of the optical fiber PFB. The measurement target S can be scanned and measured, by driving the scanning mirror 832 with drive means (not shown).

The measuring light beam L1 emitted from the light dividing means 502 is condensed by an optical lens 82 and enters the probe 830. The reflected light beam L3 emitted from the probe 830 is collimated by the optical lens 82 and enters the combining means 504.

In the optical tomography system 800 as well, the ½ wavelength plate 701 is provided so that the polarization direction of the reference light beam L2 that enters the combining means 504 and the polarization direction of the measuring light beam L1 that enters the optical fiber PFB6 from the light dividing means 502 form a 45° angle. The interference light detecting means 740, which is capable of analyzing P polarized light and S polarized light separately, is also provided.

Accordingly, the optical tomography system 800 can measure the optical rotatory power of the measurement target S, in a manner similar to the optical tomography system 700 of the seventh embodiment.

Note that light source units of SS-OCT apparatuses need not be those that rotate polygon mirrors, as in the embodiments described above. Other types of tuning light source units, that employ alternate wavelength sweeping methods, such as those that rotate or vibrate gratings, those that employ etalons and sweep the interval between the etalons, and those that provide etalons at the light incident and light emitting ends of two optical fibers that form loop shaped optical paths and sweep the interval between the etalons, may be utilized.

An optical tomography system 106 according to a twelfth embodiment of the present invention will be described with reference to FIG. 15, as an example of an SS-OCT apparatus that employs a light source unit different from those of the preceding embodiments. The optical tomography system 106 employs a fiber ring laser type light source unit 610. The only difference between the optical tomography system 106 and the optical tomography system 100 of FIG. 1 is in the structure of the light source unit 610. Accordingly, components which are the same as those of the optical tomography system 100 illustrated in FIG. 1 will be denoted with the same reference numerals, and detailed descriptions thereof will be omitted.

Figure 15:
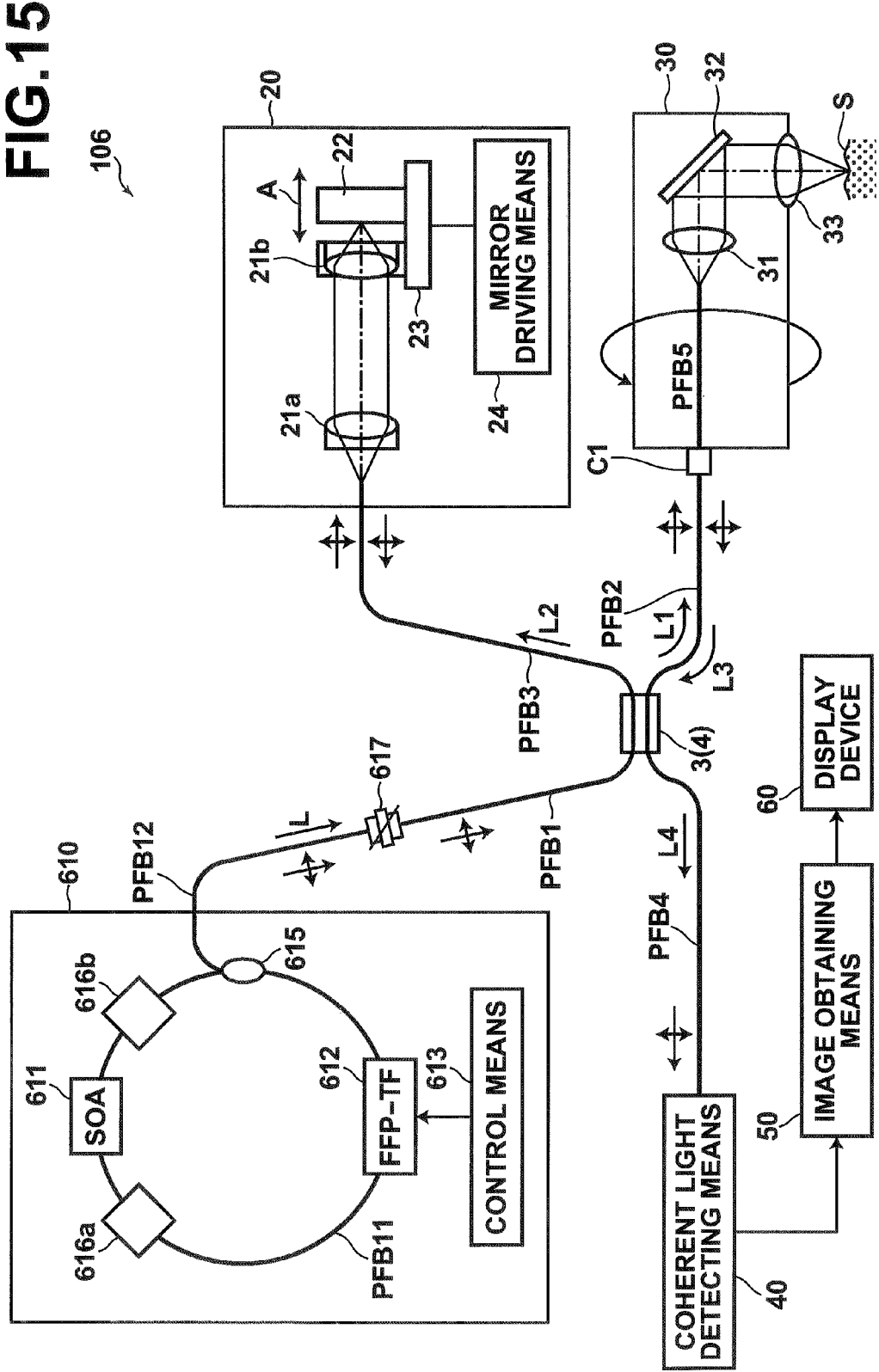
FIG. 15 is a diagram that illustrates the construction of an optical tomography system according to an exemplary embodiment of the present invention.

As illustrated in FIG. 15, the light source unit 610 comprises: an SOA 611 (Semiconductor Optical Amplifier) that functions as a light amplifying means; an optical fiber PFB11, which is a polarization maintaining optical fiber that forms a ring shaped optical path to guide a portion of the light output from the SOA 611 back to the SOA 611 as feedback light; an FFP-TF 612 (Fiber Fabry Perot-Tunable Filter); and a control means 613 for controlling the FFP-TF 612.

The light source unit 610 further comprises: an optical fiber coupler 615, which is provided along the optical fiber PFB11; and two isolators 616a and 616b, which are provided along the optical fiber PFB11. The isolators 616a and 616b determine the direction that light propagates through the optical fiber PFB11. An optical fiber PFB21, which is also a polarization maintaining optical fiber, is connected to the optical fiber coupler 615. The optical fiber PFB12 is connected to the optical fiber PFB1 via a connector 617.

The connector 617 is an APC (Angled Physical Contact) type connector. By using this type of connector, the amount of light which is reflected by the connecting surface of the connector (optical fiber) is reduced to an absolute minimum, thereby preventing deterioration of image quality of tomographic images.

The SOA 611 outputs weak discharge light to the optical fiber which is connected to one end facet thereof when drive current is injected. The SOA 611 also functions to amplify light input from the optical fiber which is connected to the other end facet thereof. Due to these functions of the SOA 611, laser oscillation occurs within a ring shaped resonator formed by the optical fiber PFB11. A portion of the laser beam is branched out by the optical fiber coupler 615, and is emitted toward the exterior of the light source unit 610 by the optical fiber PFB12.

The FFP-TF 612 is a Fabry Perot type tunable filter, and only transmits light of a specific wavelength. The specific wavelength is set by the control means 613. The FFP-TF612 and the control means 613 function as a wavelength selecting means. The wavelength selecting means enables selection of the wavelength of laser light that oscillates within the ring shaped resonator, and the light source unit 610 is enabled to sweep the wavelength of laser light emitted therefrom with a predetermined period.

On the other hand, it is necessary for the laser beam which has been emitted from the semiconductor laser medium 12 to reach the polygon mirror via various types of optical components, then to be reflected by the polygon mirror to pass through the various types of optical components again to return to the semiconductor laser medium 12, in the light source unit 10 illustrated in FIG. 1. These types of optical systems that perform wavelength sweeping using reflective surfaces of rotating bodies require high precision. That is, even fine shifts in optical axes can cause the wavelength sweeping to become unstable. In contrast, the light source unit 610 employs the mechanically stable FFP-TF. Accordingly, stable wavelength sweeping can be performed.

Optical links are established in the light source unit 610 such that the polarization direction of the laser beam emitted from the SOA 611 and the direction of one of the polarization axes of the optical fiber PFB11 are matched. An optical link is established at the optical fiber coupler 615 such that the polarization axes of the optical fiber PFB11 and the optical fiber PFB12 are matched. Similarly, the optical fiber PFB12 and the optical fiber PFB1 are optically linked at the connector 617 such that the polarization direction of light that propagates therethrough is maintained. It is preferable for the optical fiber coupler 615 to be a polarization maintaining optical fiber coupler, or a coupler which is capable of maintaining the polarization state of light to a similar degree.

The optical tomography system 106 employs a polarization maintaining optical fiber as the optical path within the light source unit, and is configured as a whole to maintain the polarization state of light. Therefore, a stable system in which polarization does not vary can be realized.

Note that R. Huber et al. also disclose a fiber ring laser type light source unit. However, R. Huber et al. are silent regarding the use of polarization maintaining optical fibers, and the maintenance of the polarization direction of light within the light source unit is not taken into consideration. Therefore, if the light source unit disclosed in R. Huber et al. is applied to an optical tomograph as is, variations in polarization will occur, and there is a possibility that signal intensity levels will vary.

Figure 16:
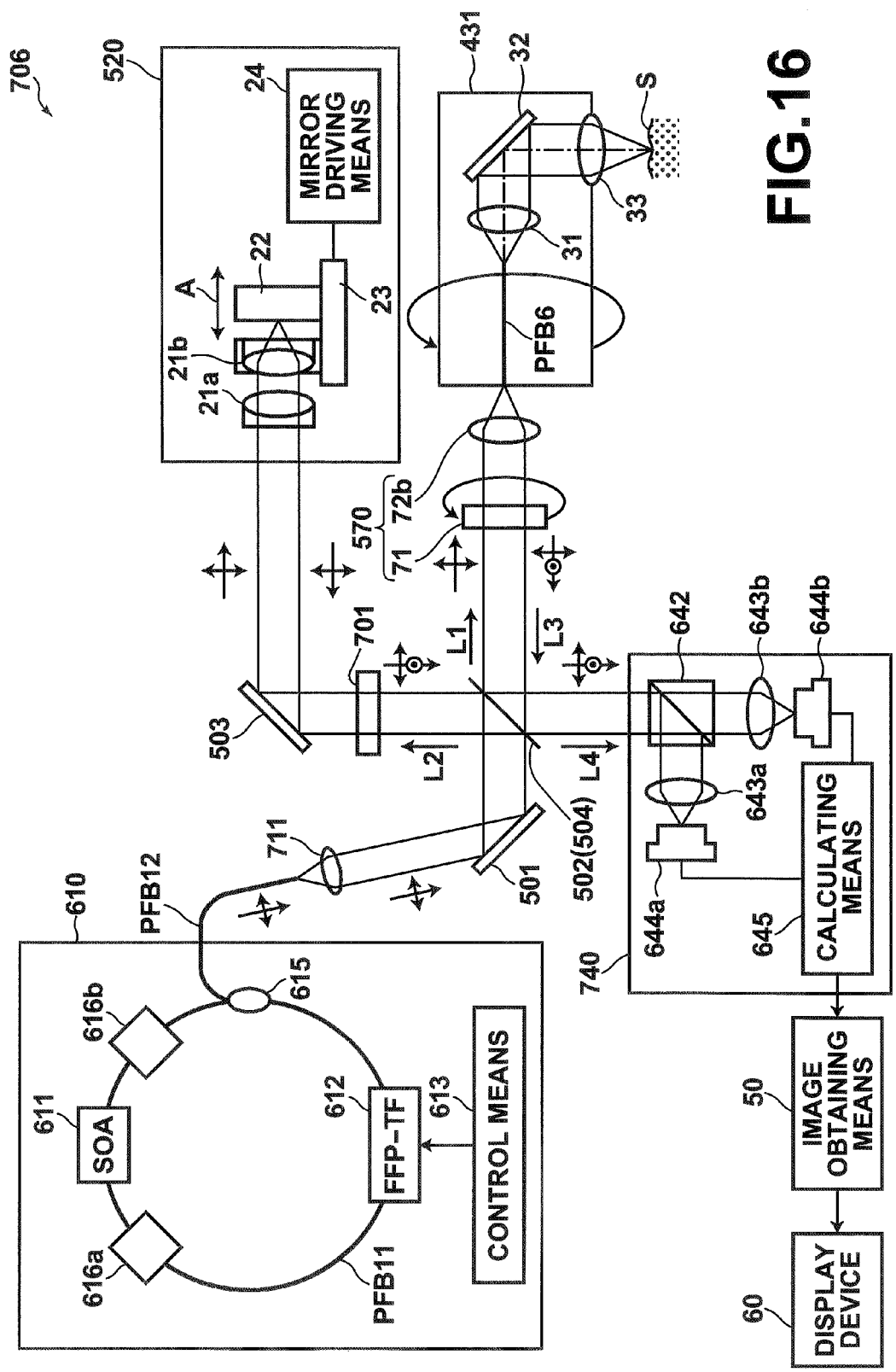
FIG. 16 is a diagram that illustrates the construction of an optical tomography system according to an exemplary embodiment of the present invention.

The light source unit 610 described above may be applied to other optical tomographs, as long as they are SS-OCT apparatuses. An optical tomography system 706 according to a ninth embodiment of the present invention will be described with reference to FIG. 16, as an example of another optical tomography system that employs the light source unit 610. In the optical tomography system 706, optical paths outside the light source unit are constituted by bulk optical systems. The basic structure of the optical tomography system 706 is the same as that of the optical tomography system 700 illustrated in FIG. 13, except for the above point and that the light source unit 610 is employed instead of the light source unit 510. The structure of the optical tomography system 706 is illustrated in FIG. 16. In FIG. 19, Components which are the same as those of the previous embodiments are denoted with the same reference numerals, and detailed descriptions thereof will be omitted.

In the optical tomography system 706, light from the light source unit 610 is emitted from the optical fiber PFB12, collimated by a lens 711, then enters a mirror 501. Here, if the polarization direction of the light that enters the mirror is set to be the same as that in the optical tomography system 700, the following operations are the same as those of the optical tomography system 700.

Figure 17:
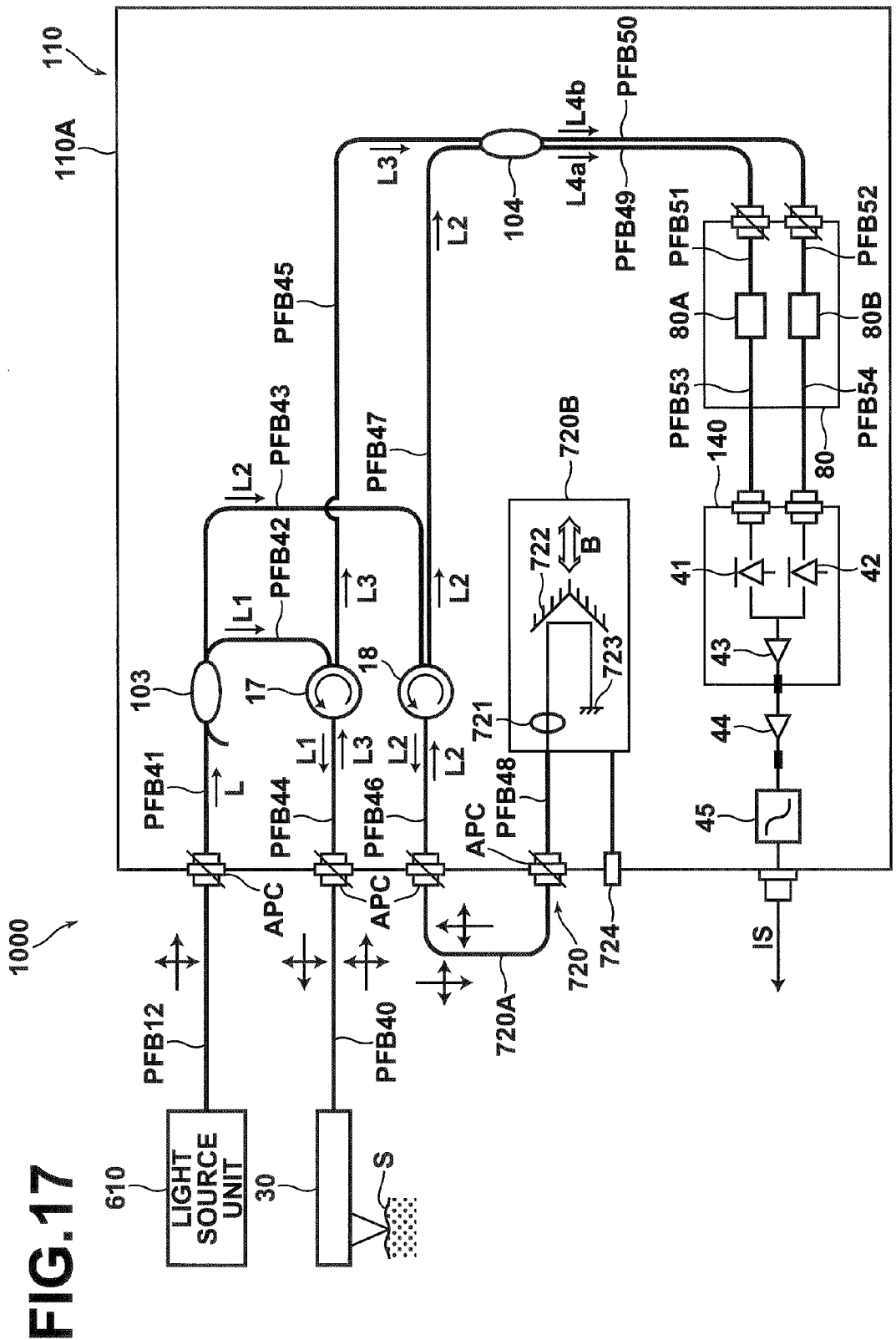
FIG. 17 is a diagram that illustrates the construction of an optical tomography system according to an exemplary embodiment of the present invention.

Note that in the embodiments described above, optical tomography systems have been described that employ Michelson interferometers. Alternatively, the present invention is applicable to optical tomographs that employ other types of interferometers as well. An example that employs a Mach Zehnder interferometer will be described with reference to FIG. 17. FIG. 17 illustrates the structure of an optical tomography system 1000 according to a tenth embodiment of the present invention. Note that FIG. 17 focuses on an interferometer 110 which is employed in the optical tomography system 1000. Components which were described in the previous embodiments, such as the light source unit 610 and the probe 30 are simplified, and the image obtaining means and the display device are omitted.

The interferometer 110 is a Mach Zehnder interferometer, and is structured by various optical components which are housed within a case 110A. The light source unit 610 and the probe 30 are provided outside of the case 110A, the optical fiber PFB12 is employed to guide light between the light source unit 610 and the interferometer 110, and an optical fiber PFB40 is employed to guide light between the probe 30 and the interferometer 110. The optical fiber PFB12, the optical fiber PFB40, and all of the optical fibers within the case 110A which are employed to guide light are all polarization maintaining fibers. All of the optical fibers are optically linked to maintain the polarization direction of light guided therethrough.

Connectors APC, which are provided on one surface of the case 110A, are employed to connect optical fibers that pass through the interior and the exterior of the case 110A. The connectors APC are APC type connectors, and by using this type of connector, the amount of light which is reflected by the connecting surface of the connector (optical fiber) is reduced to an absolute minimum, thereby preventing deterioration of image quality of tomographic images.

The interferometer 110 comprises: a light dividing means 103, for dividing the light beam L emitted from the light source unit 610 into a measuring light beam L1 and a reference light beam L2; a combining means 104, for combining the reflected light beam L3 and the reference light beam L2, which is the measuring light beam L1 reflected by the measurement target S; and a interference light detecting means 140, for detecting the interference light beam L4, which is the reflected light beam L3 and the reference light beam L2 which are combined by the combining means 104.

The light beam L emitted from the light source unit 610 is guided by the optical fiber PFB12 and enters the case 110A via a connector APC. Then, the light beam L is guided by an optical fiber PFB41 to enter the light dividing means 103. The light dividing means is constituted by a 2×2 optical fiber coupler, for example. The light dividing means 103 functions to divide the light beam L into the measuring light beam L1 and the reference light beam L2. The division ratio of the light dividing means 103 is measuring light beam L1:reference light beam L2=99:1, for example. The light dividing means 103 is optically connected to optical fibers PFB42 and PFB43. The measuring light beam L1 enters the optical fiber FB42, and the reference light beam L2 enters the optical fiber FB43.

An optical circulator 17 is connected to the optical fiber PFB42, and optical fibers PFB44 and PFB45 are connected to the optical circulator 17. The optical fiber PFB44 is connected to a connector APC, and the optical fiber PFB40 that extends outside the case 110A is connected to this connector APC. The probe 30 that guides the measuring light beam L1 to the measurement target S is connected to the optical fiber PFB40, and the measuring light beam L1 emitted from the probe 30 is irradiated onto the measurement target S. The reflected light beam L3, which is reflected by the measurement target S, enters the optical circulator 17 via the optical fiber PFB40, the connector APC, and the optical fiber PFB44. The reflected light beam L3 enters the optical fiber PFB45 from the optical circulator 17.

Meanwhile, an optical circulator 18 is connected to the optical fiber PFB43, and optical fibers PFB48 and PFB49 are connected to the optical circulator 18. An optical path length adjusting means 720, for changing the optical path length of the reference light beam L2 in order to adjust the region at which tomographic images are obtained, is connected to the optical fiber PFB46. The optical path length adjusting means 720 comprises: a coarse adjusting optical fiber 720A provided outside the case 110A, for coarsely adjusting the optical path length; and a fine adjusting means 720B provided within the case 110A, for finely adjusting the optical path length.

One end of the coarse adjusting optical fiber 720A is detachably connected to the optical fiber PFB47, and the other end thereof is detachably connected to the fine adjusting means 720B. A plurality of coarse adjusting optical fibers 720A of different lengths are prepared in advance, and an appropriate coarse adjusting optical fiber 720A is mounted, as necessary. Note that the coarse adjusting optical fiber 720A is connected to the optical fiber PFB47 and the fine adjusting means 720B via the connectors APC.

The fine adjusting means 720B comprises: the optical fiber PFB48; a collimating lens 721, for collimating the reference light beam L2 emitted from the optical fiber PFB48; a mirror 722, for reflecting the reference light beam L2 collimated by the collimating lens 721; and an optical terminator 723, for returning the reference light beam L2 reflected by the mirror 722 back to the mirror, and causing the reference light beam L2 to propagate along the same optical path in the opposite direction. The mirror 722 is fixed on a movable stage (not shown). The mirror 722 moves in the direction of the optical axis of the reference light beam L2 (the direction indicated by arrow B) by moving the movable stage, and thereby the optical path length of the reference light beam L2 is changed. The movement of the movable stage is performed by a user operating an optical path length adjusting section 724.

The combining means 104 is constituted by a 2×2 optical coupler. The combining means 104 combines the reflected light beam L3 guided by the optical fiber PBF45 and the reference light beam L2 guided by the optical fiber PFB48. The combining generates a interference light beam, and the interference light beam is divided into two interference light beams L4a and L4b by the combining means 104, which are caused to enter the optical fiber PFB49 and an optical fiber PFB50, respectively. That is, the combining means 104 also functions as a light dividing means that divides the interference light beam formed by the reference light beam L2 and the reflected light beam L3 into to interference light beams.

The interference light beams L4a and L4b which are respectively guided by the optical fibers PFB49 and PFB50 enter the interference light detecting means 140 via a variable optical attenuator 80. The variable optical attenuator 80 comprises two variable optical attenuators 80A and 80B. The variable optical attenuators 80A and 80B respectively attenuate the light intensity of the interference light beams L4a and L4b with different attenuation rates for each wavelength band, before the interference light beams L4a and L4b enter the interference light detecting means 140.

A discoid light attenuating filter and a drive means for causing the light attenuating filter about the central axis thereof is a specific example of the structure of the variable optical attenuator 80A. The light attenuating filter may have different densities along the circumferential direction thereof, for example, and may be structured to have attenuation rates (transmittance) starting at ND (neutral density). If the interference light beam L4a is caused to enter a portion of the light attenuating filter, the attenuation rate as the interference light beam L4 passes therethrough changes accompanying the rotation thereof. Thereby, the attenuation rate of the interference light beam L4a can be caused to vary over time. Note that the variable optical attenuator 80B may be of the same construction as the variable optical attenuator 80A. It is preferable for the attenuation rates imparted by the variable optical attenuators 80A and 80B to be set such that the intensity levels of the interference light beams L4a and L4b, which are detected by photodetectors 41 and 42 of the interference light detecting means 140, become substantially uniform.

Accordingly, when the interference light beams L4a and L4b, which have wavelengths that vary over time, enter the variable optical attenuators 80A and 80B, the variable optical attenuators 80A and 80B attenuate the interference light beams L4a and L4b while varying the attenuation rate to match the wavelength variation thereof. Thereby, the intensity levels of the interference light beams L4a and L4b, which are detected by photodetectors 41 and 42 of the interference light detecting means 140, become substantially uniform. Accordingly, the S/N ratio during balanced wave detection by the interference light detecting means 140 can be improved.

Here, the optical fiber PFB49 is connected with an optical fiber PFB51 provided within the variable optical attenuator 80 via a connector APC provided on one surface of the variable optical attenuator 80. The interference light beam L4a which is guided to the variable optical attenuator 80A by the optical fiber PFB51 enters the interference light detecting means 140 via an optical fiber PFB53, after being attenuated by the variable optical attenuator 80A.

Similarly, the optical fiber PFB50 is connected with an optical fiber PFB52 provided within the variable optical attenuator 80 via a connector APC provided on one surface of the variable optical attenuator 80. The interference light beam L4b which is guided to the variable optical attenuator 80A by the optical fiber PFB52 enters the interference light detecting means 140 via an optical fiber PFB54, after being attenuated by the variable optical attenuator 80B.

The interference light detecting means 140 comprises: a photodetector portion 41 for detecting the interference light beam L4a; a photodetector portion 42 for detecting the interference light beam L4b; and a differential amplifier 43, for outputting the differences between the interference light beams L4a and L4b detected by the photodetector portions 41 and 42 as interference signals IS. The photodetector portions 41 and 42 are constituted by photodiodes that perform photoelectric conversion on the interference light beams L4a and L4b incident thereon via the variable optical attenuators 80A and 80B, then input signals into the differential amplifier 43, for example. The differential amplifier 43 amplifies the differences between the interference light beams L4a and L4b, then outputs the amplified differences as the interference signals IS. The image quality of tomographic images can be improved by balanced detection of the interference light beams L4a and L4b using the differential amplifier, because same phase optical noise other than the interference signals IS can be removed while amplifying the interference signals IS.

The interference signals IS output from the interference light detecting means 140 are amplified by an amplifier 44, then input to an A/D converter (not shown) via a signal bandwidth filter 45. Noise can be removed form the interference signals IS and the S/N ratio can be improved, by providing the signal bandwidth filter 45.

Note that FIG. 17 illustrates an example in which the variable optical attenuators 80A and 80B are provided. However, in the case that the optical intensity balance between the photodetecting portions 41 and 42 is substantially uniform across the entire wavelength range without providing the variable optical attenuators 80A and 80B, they may be omitted.

In addition, in the description above, a case was described in which the division ratio at the combining means 104 is different for each wavelength band, and the attenuation rate of the variable optical attenuators 80A and 80B are variable for each wavelength band. However, in the case that the optical intensity properties of the interference light beams detected by the photodetecting portions 41 and 42 are substantially uniform across the entire wavelength range, it is not necessary to vary the attenuation rates. In this case, an attenuator having a uniform attenuation rate suitable for these properties may be employed.

Note that in the foregoing description, the first embodiment was an SS-OCT apparatus, and the second and third embodiments were an SD-OCT apparatus and a TD-OCT apparatus, to which the features of the first embodiment were applied. Similarly, the features of the fourth through tenth embodiments, and the modification to the seventh embodiment may also be applied to SD-OCT apparatuses and TD-OCT apparatuses.

Note that in the embodiments described above, polarization maintaining optical fiber couplers were employed as the light dividing means, the optical connectors, and the like. However, as long as connectors and couplers have polarization maintaining properties which are suited for practical use, they need not be polarization maintaining optical fiber couplers.

What is claimed is:

1. An optical tomography system, comprising:
a light source unit for emitting a light beam;
light dividing means, for dividing the light beam emitted from the light source unit into a measuring light beam and a reference light beam;
a probe, for guiding the measuring light beam to a measurement target, and also for guiding a reflected light beam, which is the measuring light beam reflected by the measurement target when irradiated thereon;
combining means, for combining the reflected light beam and the reference light beam;
interference light detecting means, for detecting a interference light beam, which is formed by the reflected light beam and the reference light beam being combined by the combining means; and
image obtaining means, for obtaining a tomographic image of the measurement target from the interference light beam detected by the interference light detecting means; wherein:
a polarization maintaining optical fiber, for guiding the measuring light beam and the reflected light beam, is provided within the probe;
the probe is configured to be rotatable in the circumferential direction of the polarization maintaining optical fiber; and
the length of the polarization maintaining optical fiber is an integer multiple of half a beat length, which is determined by the polarization maintaining optical fiber and the wavelength of the measuring light beam.

2. An optical tomography system as defined in claim 1, wherein:
polarization maintaining optical fibers are employed to guide the light beam from the light source unit to the light dividing means, to guide the light beam from the light dividing means to the probe, to guide the light beam from the probe to the combining means, and to guide the light beam from the light dividing means to the combining means.

3. An optical tomography system as defined in claim 1, wherein:
the light source unit emits a laser beam, of which the wavelength is swept with a predetermined period; and
the image obtaining means obtains the tomographic image of the measurement target by performing frequency analysis on the interference light beam.

4. An optical tomography system as defined in claim 3, wherein the light source unit comprises:
optical amplifying means;
a polarization maintaining optical fiber that guides a portion of the light beam output from the optical amplifying means back to the optical amplifying means as a feedback light beam; and
a tunable Fabry Perot filter, for selecting the wavelength of the feedback light beam.

5. An optical tomography system as defined in claim 1, wherein:
the light source unit emits a low coherence light beam; and
the image obtaining means obtains the tomographic image of the measurement target by performing frequency analysis on the interference light beam.

6. An optical tomography system, comprising:
a light source unit for emitting a light beam;
light dividing means, for dividing the light beam emitted from the light source unit into a measuring light beam and a reference light beam;
a probe, for guiding the measuring light beam to a measurement target, and also for guiding a reflected light beam, which is the measuring light beam reflected by the measurement target when irradiated thereon;
combining means, for combining the reflected light beam and the reference light beam;
interference light detecting means, for detecting a interference light beam, which is formed by the reflected light beam and the reference light beam being combined by the combining means; and image obtaining means, for obtaining a tomographic image of the measurement target from the interference light beam detected by the interference light detecting means; wherein:

a polarization maintaining optical fiber, for guiding the measuring light beam and the reflected light beam, is provided within the probe;

the probe is configured to be rotatable in the circumferential direction of the polarization maintaining optical fiber; and the optical tomography system further comprises polarization direction rotating means, for rotating the polarization direction of the measuring light beam that enters the polarization maintaining optical fiber accompanying rotation of the probe, in order to maintain a state in which the polarization direction of the measuring light beam that enters the polarization maintaining optical fiber and the direction of the polarization axis of the polarization maintaining optical fiber are matched.

7. An optical tomography system as defined in claim 6, wherein:

polarization maintaining optical fibers are employed to guide the light beam from the light source unit to the light dividing means, to guide the light beam from the light dividing means to the probe, to guide the light beam from the probe to the combining means, and to guide the light beam from the light dividing means to the combining means.

8. An optical tomography system as defined in claim 6, wherein:

the measuring light beam, which is irradiated onto the measurement target, is linearly polarized in a first polarization direction;

the reference light beam which enters the combining means includes components which are polarized in the first polarization direction and polarized in a second polarization direction perpendicular to the first polarization direction; and the interference light detecting means detects each of the two polarized components.

9. An optical tomography system as defined in claim 8, wherein:

polarization maintaining optical fibers are employed to guide the light beam from the light source unit to the light dividing means, to guide the light beam from the light dividing means to the probe, to guide the light beam from the probe to the combining means, and to guide the light beam from the light dividing means to the combining means.

10. An optical tomography system as defined in claim 6, wherein:

the light source unit emits a laser beam, of which the wavelength is swept with a predetermined period; and the image obtaining means obtains the tomographic image of the measurement target by performing frequency analysis on the interference light beam.

11. An optical tomography system as defined in claim 10, wherein the light source unit comprises:

optical amplifying means;

a polarization maintaining optical fiber that guides a portion of the light output from the optical amplifying means back to the optical amplifying means as a feedback light beam; and a tunable Fabry Perot filter, for selecting the wavelength of the feedback light beam.

12. An optical tomography system as defined in claim 6, wherein:

the light source unit emits a low coherence light beam; and the image obtaining means obtains the tomographic image of the measurement target by performing frequency analysis on the interference light beam.

* * * * *